(12) United States Patent
Jundt et al.

(10) Patent No.: US 9,043,716 B2
(45) Date of Patent: May 26, 2015

(54) METHODS AND APPARATUS TO CREATE PROCESS CONTROL GRAPHICS BASED ON PROCESS CONTROL INFORMATION

(75) Inventors: Larry Oscar Jundt, Round Rock, TX (US); Bruce Hubert Campney, Pflugerville, TX (US); Michael George Ott, Austin, TX (US); Stephen Gerard Hammack, Austin, TX (US)

(73) Assignee: FISHER-ROSEMOUNT SYSTEMS, INC., Austin, TX (US)

( * ) Notice: Subject to any disclaimer, the term of this patent is extended or adjusted under 35 U.S.C. 154(b) by 559 days.

(21) Appl. No.: 12/055,896

(22) Filed: Mar. 26, 2008

(65) Prior Publication Data

US 2009/0249237 A1    Oct. 1, 2009

(51) Int. Cl.
*G06F 3/048* (2013.01)
*G06F 15/177* (2006.01)
*G06F 3/00* (2006.01)
*G05B 19/042* (2006.01)

(52) U.S. Cl.
CPC .. *G05B 19/0426* (2013.01); *G05B 2219/23258* (2013.01); *G05B 2219/23261* (2013.01); *G05B 2219/23274* (2013.01); *Y10S 715/965* (2013.01)

(58) Field of Classification Search
CPC .......... G06F 3/0486; G06F 8/34; H04L 41/22
USPC ......... 715/769, 823, 771, 736, 762, 763, 792, 715/965
See application file for complete search history.

(56) References Cited

U.S. PATENT DOCUMENTS 5,371,847 A * 12/1994 Hargrove .................. 715/788
5,611,059 A    3/1997 Benton et al.
5,675,756 A   10/1997 Benton et al.
5,706,455 A    1/1998 Benton et al.
5,838,563 A   11/1998 Dove et al.
5,929,855 A    7/1999 Benton et al.
6,690,981 B1 * 2/2004 Kawachi et al. ................ 700/83
6,854,111 B1    2/2005 Havner et al.

(Continued)

FOREIGN PATENT DOCUMENTS

CN    1981301    6/2007
EP    0876647    10/2001

(Continued)

OTHER PUBLICATIONS

"Search Report," issued by the United Kingdom Intellectual Property Office on Jun. 17, 2009, in connection with corresponding application No. GB0904425.6, 3 pages.

European Office Action, issued by the European Patent Office in connection with European Application No. 09155953.4-2206, on Aug. 9, 2010, 4 pages.

(Continued)

*Primary Examiner* — Nicholas Ulrich
(74) *Attorney, Agent, or Firm* — Hanley, Flight and Zimmerman, LLC

(57) ABSTRACT

Methods and apparatus to automatically link process control graphics to process control algorithm information are described. An example method involves displaying a first process control image including process control algorithm information and displaying adjacent to the first process control image a second process control image to include process control graphics. The method automatically links at least some of the process control algorithm information to a graphic in the second process control image in response to user inputs associated with the first and second process control images.

26 Claims, 29 Drawing Sheets

(56) References Cited

U.S. PATENT DOCUMENTS

| | | | | |
|---|---|---|---|---|
| 6,971,065 | B2* | 11/2005 | Austin | 715/763 |
| 6,980,869 | B1 | 12/2005 | Chandhoke | |
| 7,086,009 | B2* | 8/2006 | Resnick et al. | 715/771 |
| 7,110,835 | B2 | 9/2006 | Blevins et al. | |
| 7,134,085 | B2* | 11/2006 | Austin | 715/763 |
| 7,134,090 | B2* | 11/2006 | Kodosky et al. | 715/769 |
| 7,146,231 | B2 | 12/2006 | Schleiss et al. | |
| 7,152,116 | B1* | 12/2006 | Austin et al. | 709/245 |
| 7,287,230 | B2* | 10/2007 | Austin et al. | 715/763 |
| 7,478,337 | B2* | 1/2009 | Kodosky et al. | 715/771 |
| 7,515,977 | B2* | 4/2009 | Eryurek et al. | 700/83 |
| 7,533,347 | B2* | 5/2009 | Santori et al. | 715/763 |
| 7,624,375 | B2* | 11/2009 | Santori et al. | 717/121 |
| 7,703,032 | B2* | 4/2010 | Wells | 715/771 |
| 2003/0101022 | A1* | 5/2003 | Shah et al. | 702/186 |
| 2005/0222698 | A1 | 10/2005 | Eryurek et al. | |
| 2005/0257204 | A1 | 11/2005 | Bryant et al. | |
| 2007/0100872 | A1* | 5/2007 | Bodin et al. | 707/102 |

FOREIGN PATENT DOCUMENTS

| | | |
|---|---|---|
| JP | 2008-503797 | 2/2008 |
| WO | 9727540 | 7/1997 |
| WO | 2005109128 | 11/2005 |

OTHER PUBLICATIONS

"Extended European Search Report," European Patent Office issued in connection with 09155953.4-2206, on Jan. 4, 2010, 7 pages.

European Office Action, issued by the European Patent Office in connection with European Application No. 09155953.4-2206, on Match 11, 2011, 4 pages.

Intellectual Property Office, "Examination Report", issued in connection with Application No. GB0904425.6, Jan. 23, 2012, (3 pages).

State Intellectual Property Office of P.R. China, "The Notification of the First Office Action", issued in connection with Chinese patent application No. 200910129112.6, May 29, 2012, (10 pages).

Chinese Patent Office, "Office Action" and partial translation, issued in connection with CN patent application 200910129112.6, mailed Feb. 20, 2013 (6 pages).

Translation of: "Notice of Reasons for Rejection" issued by the Japanese Patent Office in connection with JP patent application No. 2009-057556, mailing date Mar. 5, 2013, (3 pages).

Japanese Intellectual Property Office, "Office Action", issued in connection with corresponding Japanese Patent Application No. 2009-057556 on Dec. 10, 2013 (2 pages).

European Patent Office, "Communication pursuant to Article 94(3) EPC", issued in connection with European patent application No. 09155953.4, issued on Nov. 5, 2014, 5 pages.

* cited by examiner

METHODS AND APPARATUS TO CREATE PROCESS CONTROL GRAPHICS BASED ON PROCESS CONTROL INFORMATION

FIELD OF THE DISCLOSURE

The present disclosure relates generally to process control systems and, more particularly, to methods and apparatus to create process control graphics based on process control algorithm information.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and/or other information pertaining to the field devices, use this information to implement a control routine, and then generate control signals that are sent over the buses or other communication lines to the field devices to control the operation of the process. In this manner, the process controllers may execute and coordinate control strategies using the field devices via the buses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process, etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more software applications that perform campaign management functions, maintenance management functions, virtual control functions, diagnostic functions, real-time monitoring functions, safety-related functions, configuration functions, etc. within the process control system.

Process control systems typically provide one or more operator terminals and/or application stations including one or more graphical interfaces to enable system operators to view current process-related algorithm information that may include functions and/or parameters, statistical and/or historical process information, alarm information, campaign management and/or execution information or, more generally, information provided by any or all of the applications associated with the process control system.

System designers or engineers create process control graphics to display important process control information to system operators. This process control information may contain process control parameter information and/or process control functions. For example, a process control parameter may include a fluid flow rate associated with control process equipment (e.g., tanks, vats, mixers, boilers, evaporators, pumps, valves, etc.); while a process control function may contain information associated with portions of a process control system such as the tuning parameters in a control loop. System designers or engineers typically create process control graphics separately from the process control algorithm information. In particular, system designers or engineers often create the process graphic structure and then manually enter data sources (for numeric fields, bar graphs, tank levels, etc.) associated with process control functions and/or parameters. The system designer or engineer usually manually enters the data source by typing or browsing the data source path back to the process control algorithm information. This manual process tends to be slow and can result in incorrect path references. A given process graphic may contain hundreds of data paths, leading to a lengthy development time and an increased probability of creating an incorrect path reference.

SUMMARY

Example methods and apparatus to create process control graphics based on process control algorithm information are described. In one example, a method involves automatically linking process control graphics to process control algorithm information. In particular, a first process control image displays process control algorithm information and a second process control image adjacent to the first process control image displays process control graphics. The process control graphics are automatically linked to at least some of the process control algorithm information in response to user inputs associated with the first and second process control images. In another example, a method involves generating a graphical representation of a control algorithm of a selected control function associated with a first linked parameter of a first process control graphic.

DETAILED DESCRIPTION

Figure 1:
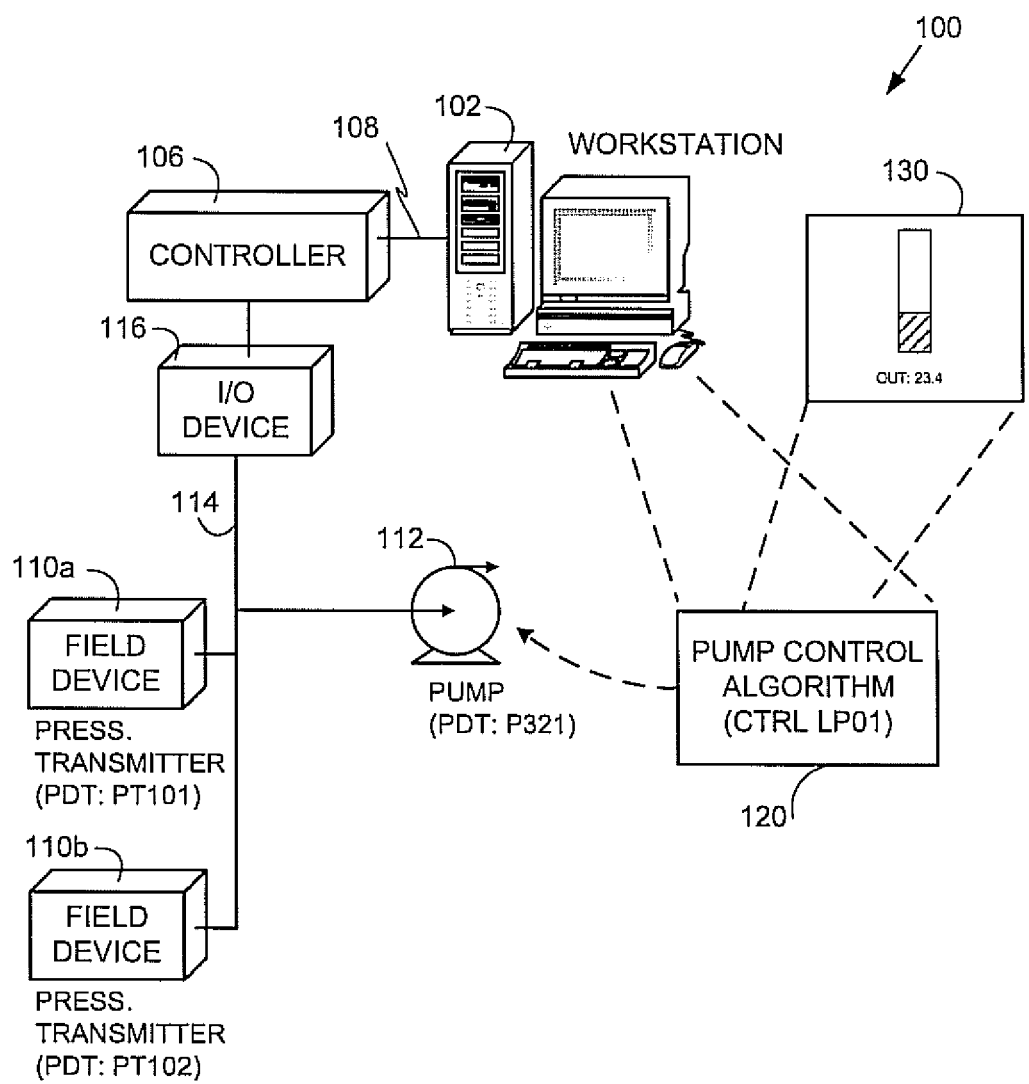
FIG. 1 is a block diagram illustrating an example process control system.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

In general, the example apparatus, methods, and articles of manufacture described herein may be used within a process control system to provide a process graphics user interface environment for use by a variety of personnel associated with the configuration and/or operation of a process control system. More specifically, the example process graphics user interface described herein may be used to host one or more process control applications such as, for example, process monitoring applications, alarm management applications, process trending and/or history applications, batch processing and/or campaign management applications, streaming video applications, advanced control applications, etc. More generally, the example process graphics user interface described herein may be used to host applications associated with the development, deployment, configuration, design, customization, operation, maintenance, and/or support of a process control system. Personnel such as, for example, information technology personnel, configuration engineers, system operators, technical support engineers, software development engineers, test engineers, etc. may utilize various aspects of the example process graphics user interface described herein to perform their duties.

A process graphic is a display representation for a parameter and/or function associated with process control algorithm information. A process graphic may include numeric fields, bar graphs, status tables and/or visual representations of tank fluid levels, pump speeds, fluid chemical concentrations, etc. Process graphics are typically used by system operators in a graphical interface to monitor control systems. The graphic elements within the interface may provide history and/or updated process information that operators may not otherwise have available. In addition, the graphic may enable system operators to change set point values and/or other parameters used by a process control algorithm. Process graphics may be implemented using a single shape graphic or a composite shape graphic. For example, some process graphics may be created by a user by enabling the user to select from different shapes and arranging the shapes to be representative of corresponding process equipment. Other process graphics may be predefined and packaged with process control software so that users can select from the predefined graphics. The process graphics may be interconnected by a user (e.g., an engineer, an operator, etc.) using a GUI-based design software application executed by a workstation.

Process graphics contain properties that, in turn, may contain data source fields with links to a cache with references to process control algorithm information and/or process control hardware information to enable displaying information within or in association with the graphical element. To provide system operators with updated information, a path to the associated parameter or function is created within or in association with the graphic. Merely entering a data value into a value field within the process graphic provides a snapshot in time of static system information and, thus, does not provide dynamic system information. For example, if a process graphic displays the volume of fluid in a tank, the graphic may contain a property and/or or data source field for a numeric value representing the fullness of the tank. As described in greater detail below in connection with the example systems and methods, to enable the process graphics to provide dynamic data, the property and/or data field includes or contains a link to the process control parameter associated with tank fullness within the process control algorithm controlling the system that includes the tank. As a result, the graphic displays changes within the tank level as the fluid level in the tank is stored in the cache of process control algorithm information.

The example methods and apparatus described herein can be used to automatically link data source fields within properties of process graphics to parameters and/or parameters within at least one function of process control algorithm information and/or process control hardware information. Traditionally, process control graphics are created separately from the process control algorithm. For example, a development group may create the process control algorithms using control systems such, for example, as the DeltaV™ control system sold by Fisher-Rosemount Systems, Inc., an Emerson Process Management company. Separately, a different development group may create the process graphics. At some stage, a process graphics designer may need to enter information relating to the data source for the process graphic. Typically, with known systems, the designer enters this information by manually typing the parameter path. Additionally or alternatively, with these known systems, the designer may have the option to use a browsing tool to locate the desired data source. In contrast to these known systems, the example methods and apparatus described herein enable a designer to automatically link process graphics to process control algorithm information using, for example, a drag and drop procedure.

In an example described herein, a designer may create a process control graphic within a first process control image. The first process control image may be a process control Graphics Studio window that is part of the DeltaV™ control system. The designer also has access to a process control algorithm within a second process control image. The second process control image may be a process control Control Studio window that is part of the DeltaV™ control system. The designer may drag a parameter from the second process control image to the graphic in the first process control image. Upon dropping the parameter onto the graphic, the example method automatically creates a link from the data source field within or associated with the graphic to the parameter. The graphic then accesses the data value within the parameter and displays the value within the graphic as defined by the graphic.

In another example, the designer may drag a parameter from the second process control image to a first process control image that does not contain a graphic. Upon dropping the parameter onto a first process control image designated for process graphics, but which does not contain such graphics, the example method determines the type of parameter that has been dropped onto the first process control image. The example method then accesses a list of graphic data representations and filters the list based on the type of parameter dropped onto the first process control image. The designer is then prompted with the filtered list of graphics. The designer selects the desired graphic(s) and the example method automatically creates a link from the data source field within the selected graphic(s) to the process control algorithm information. The graphic(s) then accesses the data value within the process control algorithm information and displays the value within the selected graphic(s).

In yet another example, the designer may highlight or select graphics from the first process control image and drag and drop the selected graphics onto the second process control image. In this example, the second process control image does not yet contain process control algorithm information. In this example, the method determines the types of graphics dragged to the second process control image. From that determination, a function list is filtered with possible process control algorithm functions. The designer selects the function(s) from the list to be created, and the example method creates the function(s) based on definitions within the function list.

In FIG. 1, an example process control system 100 that may be used to implement the example methods and apparatus described herein includes a workstation 102 (e.g., an application station, an operator station, etc.) and a controller 106, both of which may be communicatively coupled via a bus or local area network (LAN) 108, which is commonly referred to as an application control network (ACN). The LAN 108 may be implemented using any desired communication medium and protocol. For example, the LAN 108 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the workstation 102 may be used to provide redundant communication paths between the workstation 102 and a respective similar workstation (not shown).

The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 106 to communicate with other devices or systems using any desired communication media (e.g., wireless, hardwired, etc.) and protocols (e.g., HTTP, SOAP, etc.). The workstation 102 may also be configured to create process control graphics within a graphical interface from the parameters and/or functions of a process control algorithm routine. The workstation 102 may be implemented using any suitable computer system or processing system (e.g., the processor system 2600 of FIG. 26). For example, the workstation 102 could be implemented using a single processor personal computer, single or multi-processor workstations, etc.

The controller 106 may perform one or more process control algorithm routines that have been generated by a system engineer or other system personnel using the workstation 102 or any other workstation and which have been downloaded to and instantiated in the controller 106. The controller 106 may be, for example, a DeltaV™ controller sold by Fisher-Rosemount Systems, Inc., an Emerson Process Management company. However, any other controller could be used instead. Further, while only one controller is shown in FIG. 1, additional controllers of any desired type or combination of types can be coupled to the LAN 108.

The controller 106 may be coupled to a plurality of process control devices including field devices 110*a-b* and a pump 112 via a digital data bus 114 and an input/output (I/O) device 116. During execution of a process control algorithm routine, the controller 106 may exchange information (e.g., commands, configuration information, measurement information, status information, etc.) with the field devices 110*a-b* and the pump 112. This information may include parameters within process control algorithm routine functions. For example, the controller 106 may be provided with a process control routine that, when executed by the controller 106, causes the controller 106 to send commands to the field devices 110*a-b* and the pump 112 that cause the field devices 110*a-b* and the pump 112 to perform specified operations (e.g., perform a measurement, open/close a valve, enable/disable, etc.) and/or to communicate information (e.g., measurement data) via the digital data bus 114 to the controller 106 that can be accessed by the workstation 102.

In the illustrated example of FIG. 1, a pump process control algorithm 120 is configured at the workstation 102 to define properties and configuration information to control and/or interface with the pump 112 so that the pump 112 can be controlled via the process control algorithm 120 and executed by the controller 106. To identify the process control algorithm 120, it is provided with a name or identifier value (i.e., an identifier value) of CTRL LP01. A graphic 130 displays a value of a parameter within the process control algorithm 120. The process control algorithm 120 is linked to the graphic 130 by a path within a data source field of the graphic 130 pointing to a parameter within the process control algorithm 120. In this example, the graphic 130 displays the speed of the pump 112 and may be displayed on the workstation 102. In another example, the graphic 130 may be linked to parameters within process control equipment and/or hardware including the workstation 102, the controller 106, the pump 112, the input/output (I/O) device 116, and or the field devices 110a-b. In the illustrated example, although the field devices 110a-b are shown as pressure transmitters, they may be any other type of device including other types of sensors or measurement devices, actuators, etc. In addition, in the illustrated example, the pump 112 may be referred to as equipment. Equipment may also include, for example, tanks, vats, mixers, boilers, heaters, etc. However, for purposes of discussion herein, the terms device and equipment are used interchangeably.

In the illustrated example, the devices 110a-b and 112 are fieldbus compliant devices configured to communicate via the digital data bus 114 using the well-known Foundation™ Fieldbus protocol. In accordance with the Foundation™ Fieldbus standard, the digital data bus 114 is a digital, two-way, multi-drop communication bus configured to be communicatively coupled to measurement and control devices (e.g., the devices 110a-b and 112). The devices 110a-b and 112 are shown communicatively coupled to the digital data bus 114 in a multi-drop configuration. The digital data bus 114 or similar data buses may alternatively be used to communicatively couple field devices to the I/O device 116 using a point-to-point configuration in which one field device is afforded exclusive use of a digital data bus to communicate with the I/O device 116. In alternative example implementations, the methods and apparatus may be used in connection with other types of field devices (e.g., Profibus or HART compliant devices that communicate via the data bus 114 using the well-known Profibus and HART communication protocols), which may or may not include Fieldbus-compliant devices.

In the illustrated example, the I/O device 116 is implemented using an I/O subsystem interface that enables connecting the controller 106 and the devices 110a-b and 112 to other field devices, which may use the Fieldbus protocol or other types of communication protocols (e.g., Profibus protocol, HART protocol, etc.). For example, the I/O device 116 may include one or more gateways that translate between the Fieldbus protocol and other communication protocols. Additional I/O devices (similar or identical to the I/O device 116) may be coupled to the controller 106 to enable additional groups of field devices to communicate with the controller 106.

The example process control system 100 is provided to illustrate one type of system within which the example methods and apparatus described in greater detail below may be advantageously employed. However, the example methods and apparatus described herein may, if desired, be advantageously employed in other systems of greater or less complexity than the example process control system 100 shown in FIG. 1 and/or systems that are used in connection with process control activities, enterprise management activities, communication activities, etc.

Figure 2:
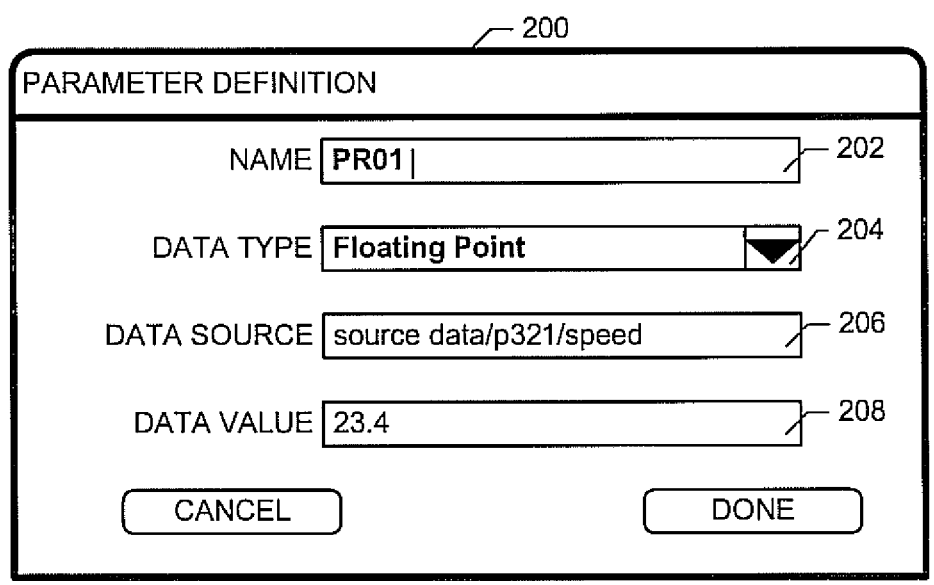
FIG. 2 illustrates an example parameter definition user interface.

FIG. 2 illustrates an example parameter definition user interface 200 that includes a name field 202, a data type field 204, a data source field 206, and a data value field 208. The parameter definition user interface 200 enables a system designer to configure information associated with a parameter. Parameters within a process control algorithm enable the process control algorithm to access data transmitted from field devices and/or process control equipment. In the illustrated example, the name field 202, the data source field 206, and the data value field 208 are implemented using a text box control. A parameter may contain one or more data source fields 206 and/or data value fields 208. The data type field 204 is implemented using a drop-down list control. The name field 202 can be used to provide a name for a parameter such as, for example, the pump 112 of FIG. 1. In the illustrated example, the parameter name provided is 'PR01,' which refers to the parameter being defined as a link to the pump speed data from the pump 112. The name field 202 may also be used by other parameters, functions, and/or graphics to locate the parameter within a process control algorithm to access the information associated with the parameter. For example, if the parameter with the name field 202 of PR01 is part of a function named PID1, and the function is part of a process control algorithm named CTRL LP01, the path address of the parameter may be <CTRL LP01/PID1/PR01>. Thus, any graphic, function, and/or parameter with a data source field containing the path address, <CTRL LP01/F01/PR01>, may access the data associated with the PR01 parameter.

The data type field 204 can be used to specify a data type that should be used to store the data from the pump 112. The data source field 206 may be configured to link the parameter to a data source such as, for example, the pump speed data associated with the pump 112. The path within the data source field 206 may be created by dragging and dropping a graphic associated with the pump 112 to the parameter, browsing a process control path, and/or typing the path. The path enables the parameter to access source data from process control equipment or field devices. For example, the data source field 206 contains a path to the pump speed data located at, <data source/p321/speed>, thereby enabling the parameter to load the data value associated with this path. The data value field 208 displays the corresponding data value, 23.4. Alternatively, the data value may be entered by a system designer, or by a function within a process control algorithm.

Figure 3:
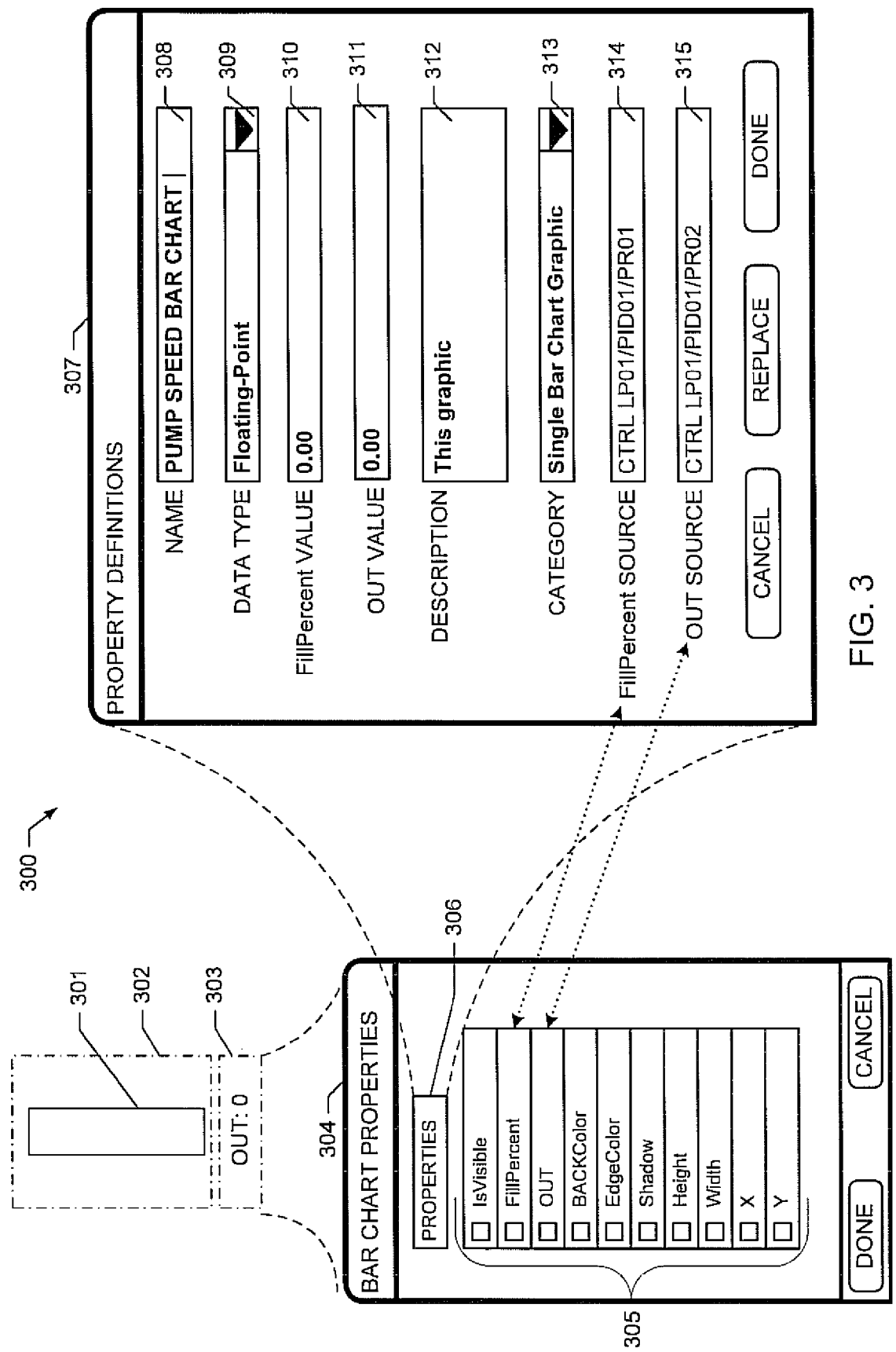
FIG. 3 illustrates an example graphic representation 300 that includes a graphic and an example graphic property user interface.

FIG. 3 illustrates an example graphic representation 300 that includes a graphic 301, a graphic property user interface 304, and an example property definition user interface 307. The graphic 301 enables a visual representation of process control algorithm information. The example graphic 301 depicts a bar graph with text indicating a numerical value associated with the fullness of the bar. Included in the graphic 301 are a first graphic field 302 and a second graphic field 303. The first graphic field 302 and the second graphic field 303 may be configured as areas on the graphic 301 where process control algorithm information may be dragged-and-dropped. For example, a parameter dragged-and-dropped onto the first graphic field 302 may create a path to the parameter to display the information associated with the parameter in the bar of the graphic 301. A second parameter dragged-and-dropped onto the second graphic field 303 may create a path to the second parameter to display the information associated with the second parameter in the text of the graphic 301. A graphic may contain one or more graphic fields. The graphic 301 is shown prior to being linked to process control algorithm information.

In the example implementation, the graphic property user interface 304 displays a set of properties 305 that correspond to the graphic 301. The set of properties 305 enables a system designer to configure display information, data sources, and/or any other characteristics associated with process control graphics. Each property within the set of properties 305 may contain one or more fields including data source fields to link process control algorithm information, and/or process control hardware information. For example, the height property within the set of properties 305 may contain a data source field and/or value field that configures the graphic 301 to be displayed at a specific height. The number and type of properties within the set of properties 305 may differ between graphics and/or graphic types. The fields within the properties may be predefined and packaged with process control software, entered by a system designer, and/or linked to process control information.

Process control algorithm information or process control hardware information may be dragged-and-dropped onto a property within the graphic property user interface 304 in the same manner as process control information may be dragged-and-dropped onto a field within the graphic 301. For example, a parameter may be dragged-and-dropped onto the BACKColor property. The BACKColor property may be configured to display a color within a fill area of the bar chart. A data source field within the BACKColor property then contains a path to the dragged-and-dropped parameter. In a run time environment, the BACKColor property may access the data value associated with the linked parameter and display the corresponding color within the fill area of the graphic 301. This enables the graphic to change the color associated with the BACKColor property as the data within the corresponding parameters changes, enabling dynamic display properties within a graphic. In the example of FIG. 3, a property definition tab 306 within the set of properties 305 opens the property definition user interface 307 including data source fields, value fields, description fields, etc. associated with the graphic 301. The property definition tab 306 may be configured to display the property definition user interface 307 data source fields and corresponding fields related to the primary data fields of the graphic 301.

In the example implementation, the property definition user interface 307 enables a system designer to configure the information associated with the graphic 301, including linking the graphic 301 to process control algorithm information. The property definition user interface 307 displays data source fields for one or more properties associated with a graphic to reduce the number of images a system designer may open to view or modify data source fields of a graphic. A graphic may contain one or more graphic property user interfaces, where each graphic property user interface may contain information corresponding to the graphic. For example, graphic property user interfaces may contain graphic properties for characterizing graphic display dimensions, shading, palette characteristics, etc.

The property definition user interface 307 includes a name field 308, a data type field 309, a FillPercent data value field 310, an OUT data value field 311, a graphic description field 312, a category field 313, a FillPercent data source field 314, and an OUT data source field 315. The data type field 309 and the category field 313 are implemented using drop-down list controls, while the name field 308, the FillPercent data value field 310, the OUT data value field 311, the graphic description field 312, the FillPercent data source field 314, and the OUT data source field 315 are implemented using a text box control. The name field 308 can be used to provide a name for a graphic. In the illustrated example, the parameter name provided is 'PUMP SPEED BAR CHART,' which refers to the graphic 301 defined as a visual representation of the pump speed of the pump 112. The data type field 309 can be used to specify a data type that should be used to display the data from the pump 112. The fields within the property definition user interface 307 may be configured by a system designer and/or predefined and packaged with process control software.

The FillPercent data value field 310 and the OUT data value field 311 may contain a data value utilized by the graphic 301 to visually represent data. There may be one or more data value fields depending on the type of graphic. For example, a valve graphic may contain two data value fields, one field for the status of the value and a second field for the fluid flow rate through the valve. The graphic description field 312 may be configured to contain text entered as notes by a system designer. The category field 313 displays the type of the graphic 301. In this example, the category field 313 displays 'Single Bar Chart Graphic,' indicating the graphic 301 is a single bar graph. A system designer may select a different graphic from the drop-down list to change the type of the graphic 301 and/or information contained in the property definition user interface 307.

The FillPercent data source field 314 and the OUT data source field 315 within the property definition user interface 307 may reference the FillPercent and the OUT properties within the set of properties 305. For example, the FillPercent property within the set of properties 305 may contain a data source field to link the first graphic field 302 to process control algorithm information. This data source field may additionally be displayed within the property definition user interface 307 as the FillPercent data source field 314.

The FillPercent data source field 314 and the OUT data source field 315 contain paths to process control algorithm information. The graphic 301 may visually represent the data associated with the path in the data first source field 314 and the OUT data source field 315. The path may point to a parameter, such as the parameter described in FIG. 2, or to process control algorithm information referenced within a source address cache, enabling the graphic 301 to access data within the parameter or the path within the source address cache. The source address cache may contain a list of addresses to process control information transmitted by field devices and/or process control equipment. The path in the FillPercent data source field 314 may be created by dragging and dropping a parameter onto the first graphic field 302 of graphic 301, browsing a process control path for a parameter, typing the path and/or dragging and dropping a parameter onto the FillPercent property within the set of properties 305. In this example, the FillPercent data source field 314 contains the path, <CTRL LP01/PID01/PR01>, which points to the process control algorithm CTRL LP01, which includes a function PID01 that contains the parameter PR01 of FIG. 2. Thus, the FillPercent data source field 314 is used to access and load the data (e.g., 23.4) associated with the PR01 parameter.

The path in the OUT data source field 315 may be created by dragging and dropping a parameter onto the second graphic field 303 of the graphic 301, browsing a process control path for a parameter, typing the path and/or dragging and dropping a parameter onto the OUT property within the set of properties 305. In this example, the OUT data source field 315 contains the path, <CTRL LP01/PID01/PR02>, which points to the process control algorithm CTRL LP01, which includes the function PID01 that contains the parameter PR02.

In this example, the FillPercent data source field 314 and the OUT data source field 315 contain paths to parameters PR01 and PR02. However, the FillPercent data value field 310 and the OUT data value field 311 contain data values 0.00. This is a result of creating the graphic 301 in a design environment. In an example where the graphic 301 is processed in a run time environment, the FillPercent data value field 310 and OUT data value field 311 may contain data values associated with the paths within the FillPercent data source field 314 and the OUT data source field 315 that point to data values from process control equipment such as, for example, the pump 112 of FIG. 1.

In another example, if one parameter is dragged-and-dropped to a graphic field within a graphic with more than one unlinked data source field, all of the unlinked data source fields within the graphic may link to the dragged-and-dropped parameter. Then, if a second parameter is dropped onto a graphic field within the graphic, only the data source field associated with the graphic field may contain a link to the second parameter.

Figure 4:
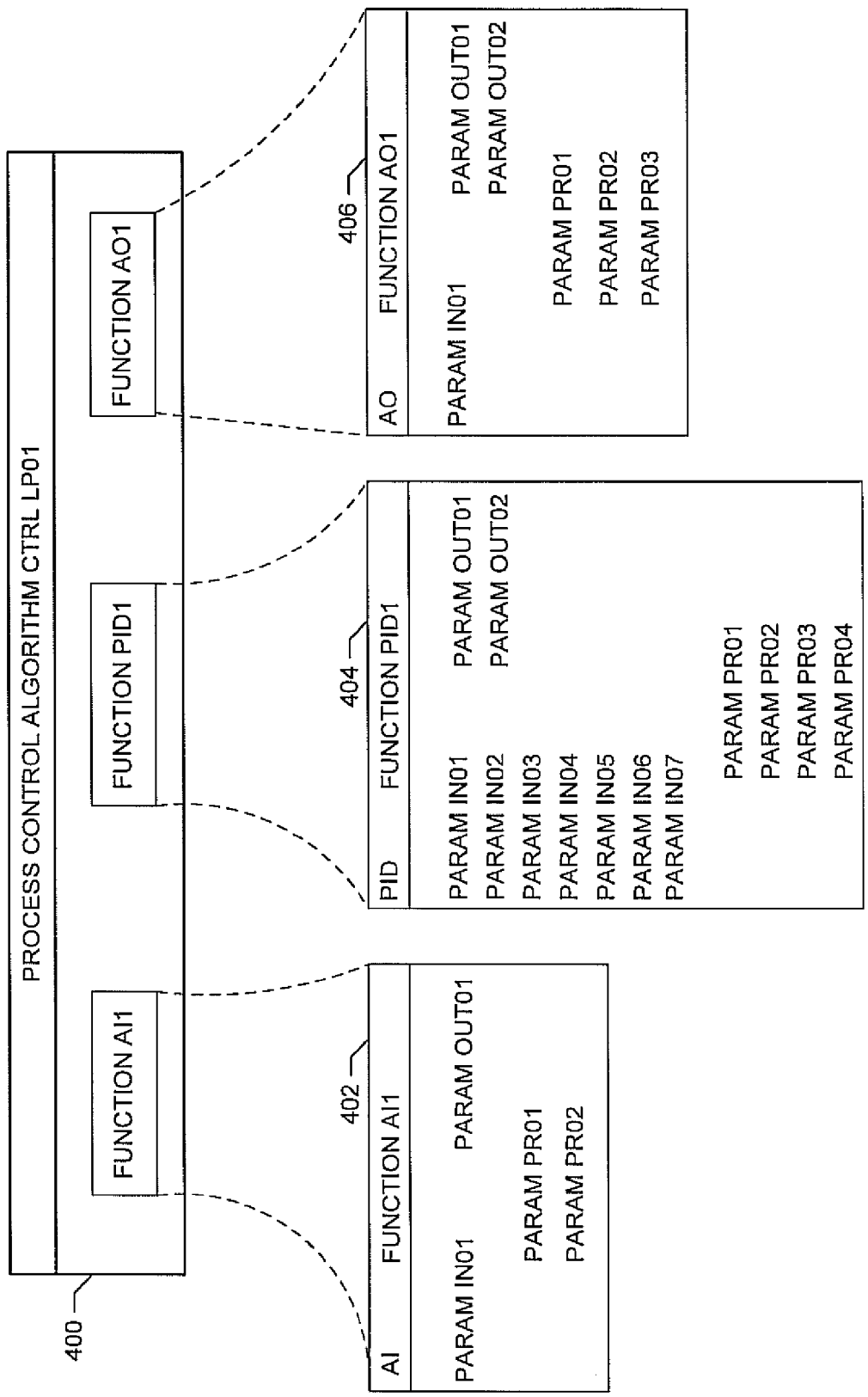
FIG. 4 illustrates a block diagram of an example process control algorithm.

FIG. 4 illustrates a block diagram of an example process control algorithm 400. The example process control algorithm 400 is utilized by the controller 106 of FIG. 1 to execute a predefined set of functions to control and monitor devices within a control system. The example process control algorithm 400 contains an input function 402, a processing function 404, and an output function 406. In other examples, an algorithm block may contain one or more functions. A function may contain a nested function which, in turn, may contain one or more nested functions. Each function performs a predefined routine associated with a process control system. The functions within a process control algorithm may or may not share data between their associated parameters. Typically, a function is configured to execute a specific type of task. For example, a first function may collect and filter analog input data, a second function may process the collected and filtered data according to a set of rules, and a third function may provide feedback control for a physical device.

In the example process control algorithm 400, the functions 402-406 contain input parameters, output parameters and intermediate parameters. In other example implementations, the functions 402-406 may contain zero or more of each type of parameter in addition to other parameter types. The parameters within a function enable the function to link to data sources not contained within the function. A parameter may contain a link to a source address cache containing addresses to field devices that may transmit process control algorithm information such as, for example, data transmitted from field devices (e.g. the devices 110a and 110b of FIG. 1) and/or process control devices (e.g., pump 112). Additionally, a parameter may link to another parameter within a different function. In the example of FIG. 4, the process control algorithm 400 contains an identifier, CTRL LP01. The functions 402-406 that make up the process control algorithm 400 contain their own identifiers, AI1 for the input function 402, PID1 for the processing function 404, and AO1 for the output function 406. Additionally, the functions 402-406 contain function types, AI for the input function 402, PID for the processing function 404 and AO for the output function 406. The function type associates a classification with a function. The function type may be used by a graphics list filter to determine corresponding graphics if a function is dragged-and-dropped to a process control graphic image. For example, a function type of PID may classify a function as a proportional-integral-derivative feedback control algorithm. If this function is dragged-and-dropped to a process control graphic image, a graphics list filter prompts a user with a list of graphics that corresponds to the PID function.

Within each function, the parameters contain their own identifiers stored in the name field 202 of FIG. 2. For example, the input function 402 includes parameters IN01, PR01, PR02, and OUT01. The IN01 parameter may be located at a hierarchical path location of <CTRL LP01/AI01/PR01>. If the IN06 parameter of the processing function 404 is configured to access the data in the PR01 parameter within the input function 402, the IN06 parameter contains <CTRL LP01/PID01/PR01> in the data source field 206. The parameters included in a function may also associate with the corresponding function type. For example, the parameter IN01 included in the input function 402 may be associated with the AI function type. A graphics filter may use the function type associated with a dragged-and-dropped parameter to create a list of corresponding graphics. In another example, a parameter in a first function may be connected or linked to a parameter in a second function by creating a wire between the parameters to be linked within the first and second functions.

In an example, the input function 402 may be configured to convert raw data associated with a pump speed of the pump 112 to a refined numerical value. The input function 402 loads the raw data value from the input parameter PARAM IN01 that contains a path to the pump speed analog data referenced within the source address cache. The input function 402 then processes the pump speed analog data to generate a numerical pump speed value and stores the numerical pump speed value to the data value field 208 of the output parameter, PARAM OUT01. The intermediate parameters PARAM PR01 and PARAM PR02 may contain data associated with the processing of the pump speed raw data, such as a mathematical overflow flag or a fractional remainder from a division calculation. The processing function 404 may access the numerical pump speed value through the path within the data source field 206 of the input parameter PARAM IN04 to link to the output parameter PARAM OUT01 of the input function 402. For example, the data source field 206 of the input parameter PARAM IN04 may contain the path </CTRL LP01/AI1/PARAM PR01> to link to the output parameter PARAM OUT01 of the input function 402.

Figure 5:
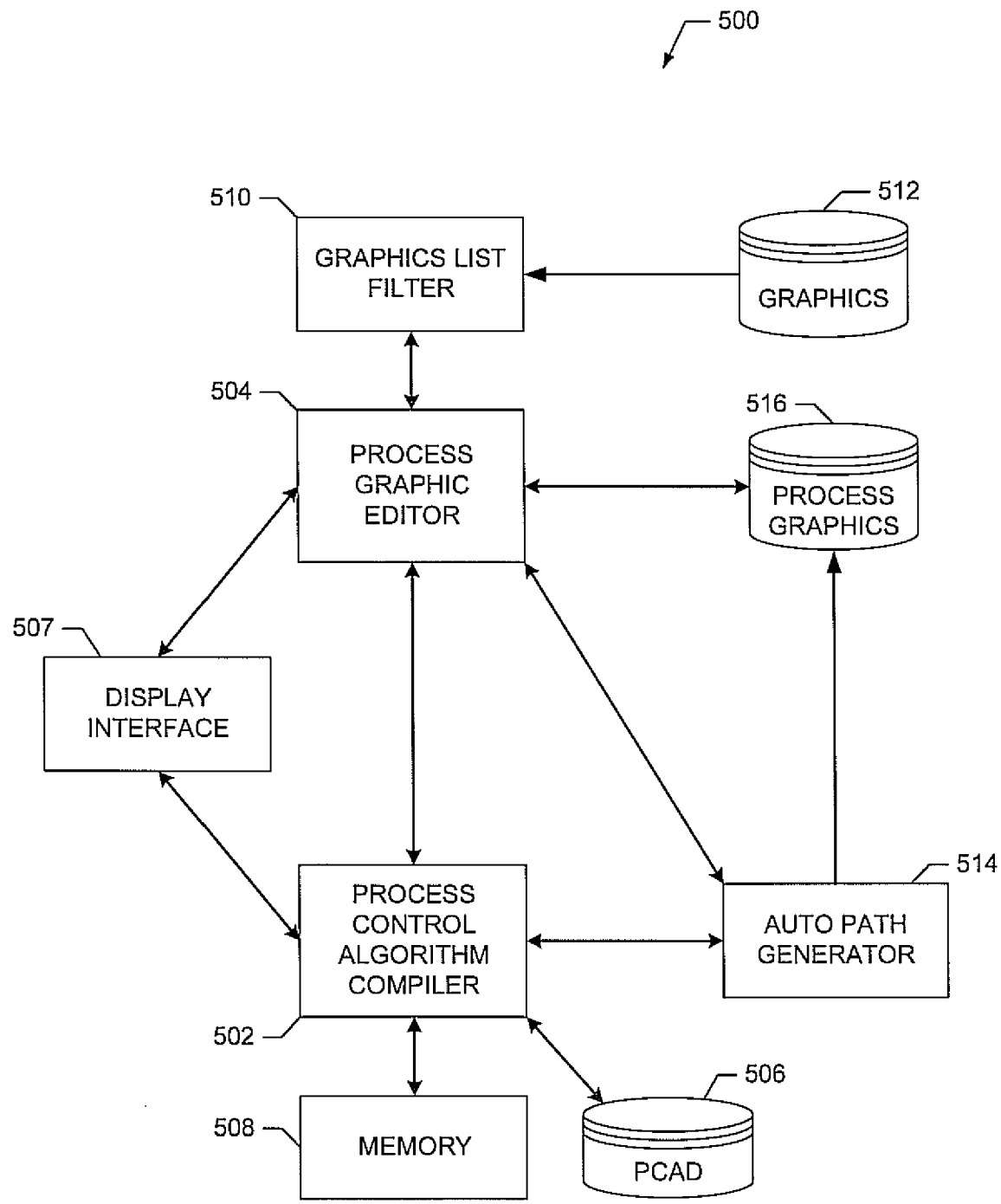
FIG. 5 illustrates a block diagram of an example apparatus that may be used to automatically link process control algorithm information to process control graphics.

FIG. 5 is a block diagram of an example apparatus 500 that may be used to automatically link process control algorithm information to process control graphics. The example apparatus 500 includes a process control algorithm compiler 502, a process graphic editor 504, a process control source address cache 506, a display interface 507, a memory 508, a graphics list filter 510, a graphics cache 512, an auto path generator 514, and a process graphics cache 516, all of which may be communicatively coupled as shown or in any other suitable manner. A system designer may utilize the example apparatus 500 to create and edit process graphics from process control algorithm information within a design environment. The design environment may be an offline workstation that is separate from the run time environment, or an online workstation such as the workstation 102 depicted in FIG. 1. By having a separate design environment a system designer may configure a user interface that may not be modified by system operators who may only have access to the run time environment.

The example apparatus 500 may be implemented using any combination of hardware, firmware, and/or software. For example, one or more integrated circuit(s), programmable processor(s), application specific integrated circuit(s) (ASIC(s)), programmable logic device(s) (PLD(s)), field programmable logic device(s) (FPLD(s)), discrete semiconductor component(s), or passive electronic component(s), etc may be used. Additionally or alternatively, some or all of the blocks of the example apparatus 500, or parts thereof, may be implemented by instructions, code, and/or other combination of software and/or firmware, etc. stored on a machine accessible medium that, when executed by, for example, a processor system (e.g., the processor system 2600 of FIG. 26) perform the operations represented in the flow diagrams of FIGS. 24A-24D and 25. Although the example apparatus 500 is described as having one of each block described below, the example apparatus 500 may be provided with two or more of any block described below. In addition, some blocks may be disabled, omitted, duplicated, or combined with other blocks.

In the illustrated example, the process control algorithm complier 502 is communicatively coupled to the process control source address cache 506, the memory 508, the process graphic editor 504, the display interface 507, and the auto path generator 514. In this example implementation, the process control algorithm complier 502 is configured to load a process control application from the memory 508 and process control algorithm information and/or source data referenced within the process control source address cache 506 to create a process control algorithm that may be used to monitor and/or control a system and/or a process in a run time environment. The process control algorithm, which may be similar to the process control algorithm 400 of FIG. 4, includes at least one process control function containing at least one process control parameter. The process control functions and/or parameters may be configured to reference process control algorithm information referenced within the process control source address cache 506.

The process control source address cache 506 is a storage device and/or memory that may be configured to store addresses to process control algorithm information from a plurality of communicatively coupled field devices such as, for example, the field devices 110a and 110b, or the pump 112 of FIG. 1. Process control information may contain field device status, measurement data, sensor data, etc. The process control source address cache 506 is a reference storage device for the process control algorithm. This enables more than one process control algorithm to access the same process control algorithm information without needing to duplicate the process control algorithm information.

The display interface 507 may display a process control image of the process control algorithm compiler 502, enabling a system designer to create and/or modify process control algorithm functions and/or parameters including modifying the control of a function, adding a path within a parameter data source field 206, creating links between parameters in different functions, etc. The process control image may include an application window, graphical interface window, etc. A process control algorithm may be created by the system designer, within a design environment such as, for example, the DeltaV™ Control Studio™ sold by Fisher-Rosemount Systems, Inc., an Emerson Process Management company.

In the example implementation, the process control algorithm compiler 502 may be coupled to the process graphic editor 504 when at least one process control algorithm function and/or parameter is selected (e.g., dragged) from the process control algorithm within the process control algorithm compiler 502 and dropped onto a graphic included in a process control image within the process graphic editor 504. The selected function and/or parameter may also be dropped onto a process control image without a graphic. This drag-and-drop action enables a system designer to automatically link data sources within selected process control functions and/or parameters included in the process control algorithm compiler 502 to one or more graphics within the process graphic editor 504. This drag-and-drop action may additionally include other example implementations such as select-and-paste, copy-and-paste, highlight-and-paste, box-and-move, lasso-and-insert, etc. For purposes of discussion herein, terms describing the drag-and-drop action are used interchangeably.

Another example implementation may contain more than one process control algorithm compiler 502. In such an implementation, a system designer may drag-and-drop at least one process control algorithm function and/or parameter from a first process control algorithm compiler 502 to a process graphic editor 504, and drag-and-drop at least one process control algorithm function and/or parameter from a second process control algorithm compiler 502 to the same process graphic editor 504. In this example implementation, the process graphic editor 504 contains graphics with links to the first and second process control algorithm compliers.

The display interface 507 may display a process control image of the process graphic editor 504 enabling a system designer to create and manage process control graphics for use within a process control graphical interface. The process control graphical interface provides a visual representation of process control algorithm information that may be used by system operators to monitor and/or control a system. The process graphic editor 504 is communicatively coupled to the graphics list filter 510, the auto path generator 514, the process graphics cache 516, and the process control algorithm complier 502. In the example implementation, the display interface 507 displays the image of a process graphic editor 504 using graphics. The process control image may include an application window, graphical interface window, etc. A graphic may be selected from the graphics cache 512 or manually created by the system designer using, for example, the DeltaV™ Graphics Studio™ sold by Fisher-Rosemount Systems, Inc., an Emerson Process Management company. The graphics cache 512 contains saved generic graphics such as a bar graph, pump parameters, a pie chart, etc. The generic graphics may be created by a system designer and/or predefined and packaged with process control software.

In an example implementation, the process graphic editor 504 accesses the graphics list filter 510 when process control algorithm information is dragged-and-dropped into a process control image within the process graphic editor 504. In one example, the process graphic editor 504 may not contain a graphic to associate with the dragged-and-dropped process control algorithm information. In this example, the process graphic editor 504 communicates the type of dragged-and-dropped process control algorithm information to the graphics list filter 510, such as information contained in the data type field 204 of FIG. 2, the data in the name field 202, the function type associated with the parameter and/or any other process control algorithm information that may be associated with a parameter and/or parameter(s) within a function. The graphics list filter 510 compiles the parameter information and accesses a filter look-up table. The look-up table may be a list of combinations of parameter information with a cross reference to combinations of graphic type information. The graphic type information may include data within the data type field 309 of FIG. 3 and/or the category field 313. The graphic type information may correspond to one or more graphics. In the case a parameter contains more than one data source field 206 and/or more than one parameter is dragged-and-dropped onto the process control graphic image and/or graphic, the process graphic editor 504 may display a list of parameters and/or data source fields 206. A system designer may select the data source fields 206 and/or parameters to be linked to a graphic.

In an example implementation, a parameter with a data type field of FLOATING POINT and an associated function type of PID is dragged-and-dropped to a process control graphic image. The graphics list filter 510 may compile the FLOATING POINT and PID information and access the filter look-up table. In this example, a combination of FLOATING POINT and PID cross references to graphics with data types of FLOATING POINT and/or DOUBLE FLOATING POINT, and a category field containing PUMP, VALVE, MOTOR, TUNING PARAMS, and/or OVERVIEW. The graphics list filter 510 accesses the graphics cache 512 and determines the graphics that include a data type field of FLOATING POINT and/or DOUBLE FLOATING POINT and a category field with PUMP, VALVE, MOTOR, TUNING PARAMS, and/or OVERVIEW. The matched and/or similar graphics are then transmitted by the graphics list filter 510 to the process graphics editor 504 to be displayed within a prompt list. The process graphic editor 504 then loads the user selected graphic(s) and notifies the auto path generator 514.

The graphics list filter 510 may transmit a prompt list including all graphics within the graphics cache 512 if a match cannot be made between the parameter information and the graphic type information. In another implementation, the graphics list filter 510 may return an empty prompt list and/or error message if a match cannot be made between the parameter information and the graphic type information. When parameter information and graphic type information are not cross referenced within the filter look-up table, a user may create the cross reference by editing the filter look-up table. Additionally, the graphics list filter 510 may create a cross reference between parameter information and graphic type information when a user drags-and-drops a parameter onto a graphic. The parameter information, graphic type information, and/or cross reference included within a filter look-up table may be created by a system designer or predefined and packaged with process control software. In another example implementation, the filter look-up table may contain a direct association of graphics and parameters. For example, a parameter PR01 may be cross referenced to a graphic with a category field of SINGLE BAR CHART GRAPHIC.

In the example apparatus 500, the process graphic editor 504 and the process control algorithm compiler 502 are communicatively coupled to the auto path generator 514. The auto path generator 514 is configured to automatically create a link from the graphics within the process graphic editor 504 to the process control algorithm information within the process control algorithm compiler 502. In particular, the auto path generator 514 receives a notification from the process graphic editor 504 that at least some process control algorithm information was dragged-and-dropped to a graphic. The notification may include a graphic identifier, a parameter identifier and/or a function identifier of the dragged-and-dropped process control algorithm information. The auto path generator 514 then accesses the process control algorithm compiler 502 and copies the path information of the process control algorithm information parameter and/or function. The auto path generator 514 stores the path location or path in the FillPercent data source field 314 of FIG. 3 of a graphic. This enables the graphic to access the process control algorithm information contained in the process control algorithm parameter and/or function.

In an example, a system designer may select a pump speed process control parameter, PS25, included in function PID1 within a process control algorithm CTRL LP01, and drop the PS25 parameter onto a bar chart graphic labeled BC01 within an image of the process graphic editor 504 displayed in the display interface 507. The bar chart graphic BC01 includes a data source field 314, configured for a numeric value to display the height of a bar in the bar chart BC01. The process graphic editor 504 notifies the auto path generator 514 of the graphic BC01, the PS25 parameter, the CTRL LP0 process control algorithm, and the PID1 function. The auto path generator 514 accesses the CTRL LP01 process control algorithm and searches for the PID1 function. Within the PID1 function, the auto path generator 514 searches for the PS25 parameter. The auto path generator 514 then copies the path associated with the PS25 parameter (e.g. <CTRL LP01/PID01/PR01>). The auto path generator 514 then accesses the BC01 graphic and pastes the path into the data source field 314. In the runtime environment, the BC01 graphic uses the path in the FillPercent data source field 314 to access the PS25 parameter data value field 208 to display a bar height associated with the pump speed.

In another example implementation, when the process control algorithm parameter contains path data within the process control source address cache 506, the auto path generator 514 may copy the path of the reference within the process control source address cache 506 and/or the parameter path. In this example, the data value within the graphic will be the same value regardless of whether the graphic property path is linked to a parameter within the process control algorithm or to the reference within process control source address cache 506.

The process graphic editor 504 may be configured to load graphics from the process graphics cache 516. The process graphics cache 516 is a storage device and/or memory configured to save process control graphics created using the process graphic editor 504. The process control graphics saved in the process graphics cache 516 may include saved graphics that have been linked to process control algorithm information. In the example process control system 100 of FIG. 1, an operator using the workstation 102 may view a graphical interface display of a process control system including the process control graphics saved in the process graphics cache 516.

Figure 6:
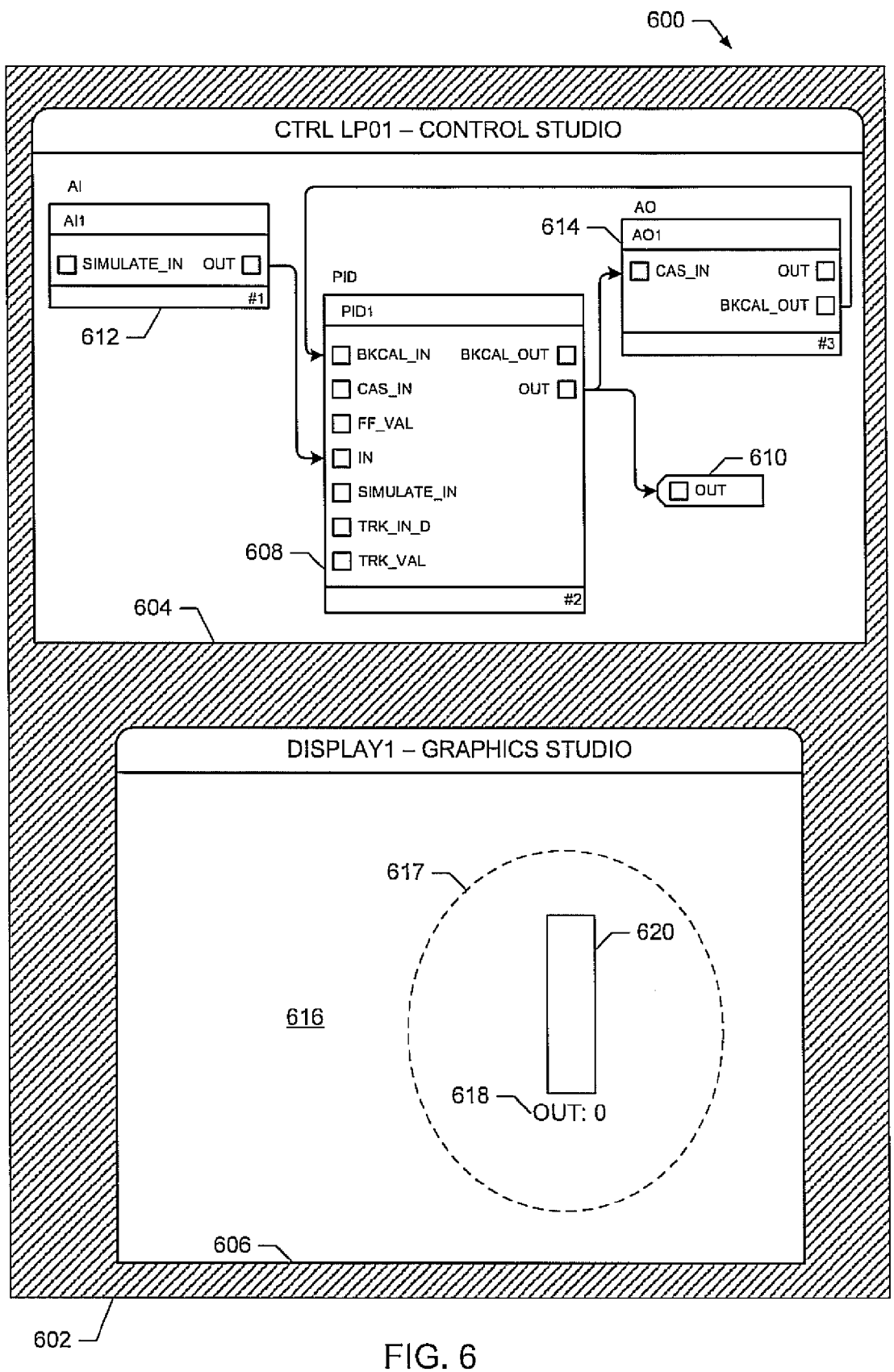
FIG. 6 illustrates an example process control environment including a display containing a process control algorithm image and a process control graphic image.

FIG. 6 illustrates an example process control environment 600 including a display 602 containing a process control algorithm image 604 and a process control graphic image 606. The process control algorithm information image 604 and/or the process control graphic image 606 may be a graphical user interface, application window, etc. The display 602 may include one or more computer workstation displays and the process control algorithm information image 604 may be included in a different display than the process control graphic image 606. The process control algorithm image 604 contains information from the process control algorithm compiler 502 of FIG. 5, and the process control graphic image 606 contains information from the process graphic editor 504 of FIG. 5. Although the display 602 is described as having one process control algorithm image 604 and one process control graphic image 606, the display 602 may include two or more process control algorithm images and/or process control graphic images.

The process control algorithm image 604 named CTRL LP01 includes a process control algorithm that contains functions 608, 612, and 614, which are coupled to create a proportional-integral-derivative (PID) feedback control algorithm. The functions 608, 612, and 614 include an analog input function 612, a processing or PID control function 608, and an analog output function 614. Although the process control algorithm information image 604 is described as having one of each block described below, the process control algorithm information image 604 may include two or more of any block described below.

In the example implementation, the input function 612 provides an input value to the processing function 608. The processing function 608 is configured to have inputs from other functions and/or parameters, and outputs to various other functions and/or parameters. The processing function 608 processes the data from the input function 612 and the output function 614 to create a value specified in the data value field of an output parameter 610. Additionally, the output function 614 utilizes the output from the processing function 608 as an input. For example, the processing function 608 is a PID feedback control algorithm configured to provide output flow control for the pump 112 of FIG. 1 within the process control system 100. In that case, the input function 612 may access the process control source address cache 506 to load the value of a fluid flow rate from the pump 112. The value may be a raw number or value collected by a sensor associated with an output of the pump 112. The input function 612 sends the fluid flow value to the processing function 608. The processing function 608 calculates a meaningful rate value from the raw data from the sensor and sends the calculated fluid flow rate to the output function 614. The processing function 608 may also use the feedback from the output function 614 to provide control adjustments to the fluid flow within the pump 112 based on differences between the specified or desired and measured flow values. The output function 614 compares the fluid flow rate of the pump 112 to an operator specified target value and returns the difference to the processing function 608. The output parameter 610 is configured to report the fluid flow rate as a parameter within the process control algorithm.

The example process control graphic image 606 within the display 602 includes a graphic image area 616 containing a graphic 617, which includes a text data representation 618, and a visual graphical data representation 620. The graphic 617 may have a corresponding graphic property user interface similar to the property definition user interface 307 of FIG. 3 and may have been loaded from the graphics cache 512 of FIG. 5 or created manually. The text data representation 618 is configured to display a value within a property field associated with the graphic 617. The visual graphical data representation 620 is configured to display an area fill of the bar associated with the value within a property field associated with the graphic 617. In the example implementation, the graphic 617 has not yet been linked to a data source and, thus, the text data representation 618 and the graphical data representation 620 are shown with a null data value. As described in greater detail below, the graphic 617 is linked with a data value by selecting the output parameter 610, dragging the output parameter 610 to the graphic image area 616 of the process control graphic image 606, and dropping the output parameter 610 on the graphic 617.

Figure 7:
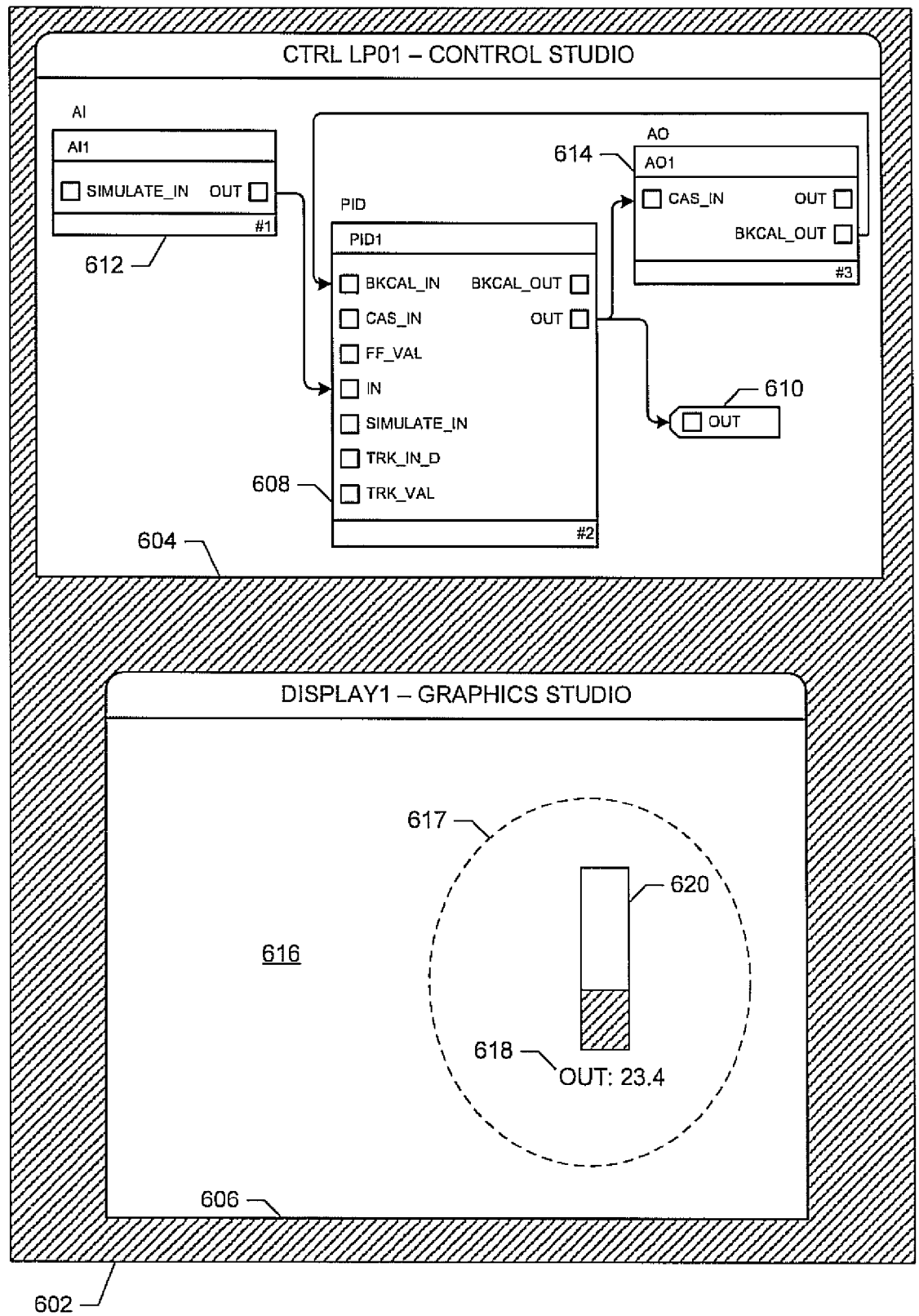
FIG. 7 illustrates the process control algorithm image of FIG. 6 linked to the process control graphic image of FIG. 6.

FIG. 7 illustrates the process control algorithm image 604 of FIG. 6 linked to the process control graphic image 606 of FIG. 6. In FIG. 7, the process control graphic image 606 depicts the process control graphic image 606 of FIG. 6 with the output parameter 610 as automatically linked to a data source field associated with the graphic 617. The automatic linking, which was initiated by selecting-and-dragging the output parameter 610 to the graphic 617, is performed by the auto path generator 514 of FIG. 5. As a result of the automatic linking, the data source fields within the graphic 617 contain the path associated with the output parameter 610. Thus, during runtime, the graphic 617 stores the data value associated with the output parameter 610 path in the data value field 310 associated with the graphic 617. Additionally, the text data representation 618 now displays a text value associated with the value within the data value field associated with the graphic 617. Similarly, the graphical data representation 620 now displays a portion of the bar filled to visually depict the value associated with the value within the data value field associated with the graphic 617. In this manner, the graphic 617 of FIG. 7 shows, for example, the fluid flow rate of the pump 112.

Figure 8:
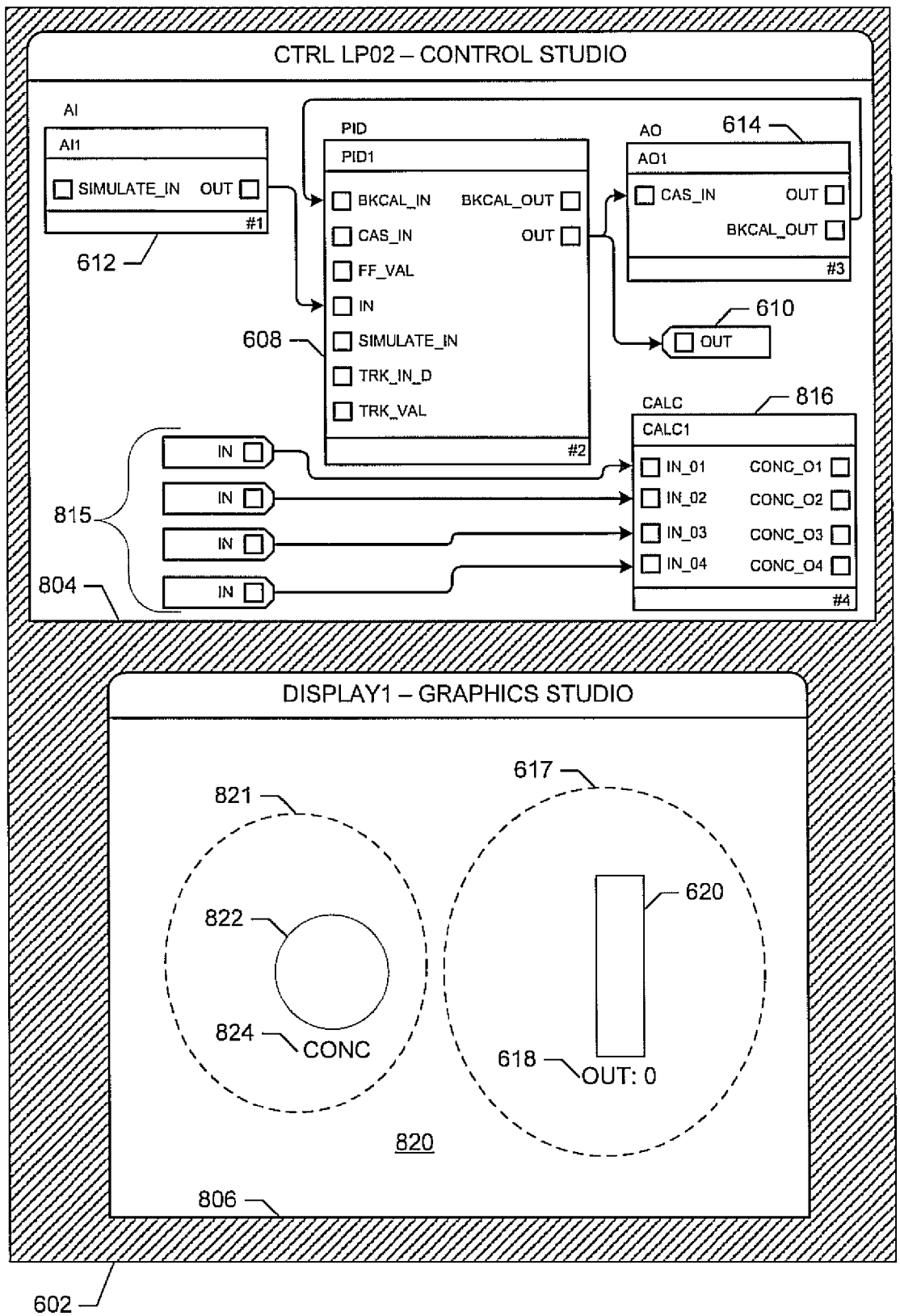
FIG. 8 illustrates a process control algorithm image, which is similar to the process control algorithm image of FIG. 6, but which contains a second function that includes four output parameters.

FIG. 8 illustrates a process control algorithm image 804, which is similar to the process control algorithm image 604 of FIG. 6, but which contains a concentration function 816 that includes four output parameters CONC_01-CONC_04 and four input parameters 815. The display 602 also includes a process control graphic image 806, which is similar to the process control graphic image 606, but which contains two graphics. In particular, the process control graphic image 806 includes the graphic 617 and a second graphic 821. Additionally, the process control algorithm information image 804 includes a process control algorithm including the functions 608, 612, and 614 coupled to create a feedback control algorithm. The concentration function 816 includes a function type of CALC, indicating the function block is configured to perform calculations. Although the control algorithm information image 804 is described as having one of each function described below, the process control algorithm information image 804 may include two or more of any function described below.

In the example implementation, the input function 612, the processing function 608, and the output function 616 are configured as described above in connection with FIG. 6. In this example implementation, the feedback control algorithm depicted in the process control algorithm image 804 is configured to provide flow control for a pump (e.g., the pump 112) within a process control system (e.g., the process control system 100). The process control algorithm includes the output parameter 610, which includes a path to the fluid flow rate that is associated with the pump and which is referenced in the process control source address cache 506 of FIG. 5, and the concentration function 816, which includes the four input parameters 815 containing paths to the chemical concentrations of the fluid within the pump. The four parameters associated with the concentration function 816 may access the process control source address cache 506 to reference addresses of sensors transmitting chemical concentrations of the fluid within the pump. The chemical concentration data source may be transmitted to the four input parameters 815 by one or more sensors in close proximity to the pump. The concentration function 816 may process the concentration data source from the four input parameters 815 to determine concentration percentages of one or more chemical constituents of the fluid in the pump.

The example process control graphic image 806 within the display 602 includes a graphic image area 820 containing the second graphic 821 and the graphic 617 of FIG. 6, which includes the text data representation 618, and the graphical data representation 620. The graphic 617 and the second graphic 821 may be loaded from the graphics cache 512 of FIG. 5 or created manually. The second graphic 821 includes a second text data representation 824 and a second graphical data representation 822. The second text data representation 824 is configured to display a value within a property field associated with the second graphic 821. The visual graphical data representation 822 is configured to display an area fill of a pie chart associated with the value(s) within a property field associated with the second graphic 821. In the example of FIG. 8, the graphic 617 and the second graphic 821 have not yet been linked to a data source. As a result, the text data representation 618, the graphical data representation 620, the second text data representation 824, and the second graphical data representation 822 are displayed with null data values.

In the example, the graphic 617 is linked to a data value by selecting the output parameter 610, and dragging the output parameter 610 to and dropping it on the graphic 617. Similarly, the second graphic 821 is linked to the four parameters (e.g. CONC_01-CONC_04) within the concentration function 816 by selecting and dragging the concentration function 816 to and dropping it on the second graphic 821. The output parameter 610 and the four parameters within the concentration function 816 may be selected individually and dragged to and dropped on the corresponding graphics. In another example, the output parameter 610 and the four parameters within the concentration function 816 may be selected together and dragged to the graphic image area 820. In this case, the process graphic editor 504 of FIG. 2 may prompt a system designer to specify which parameter to link to which graphic.

Figure 9:
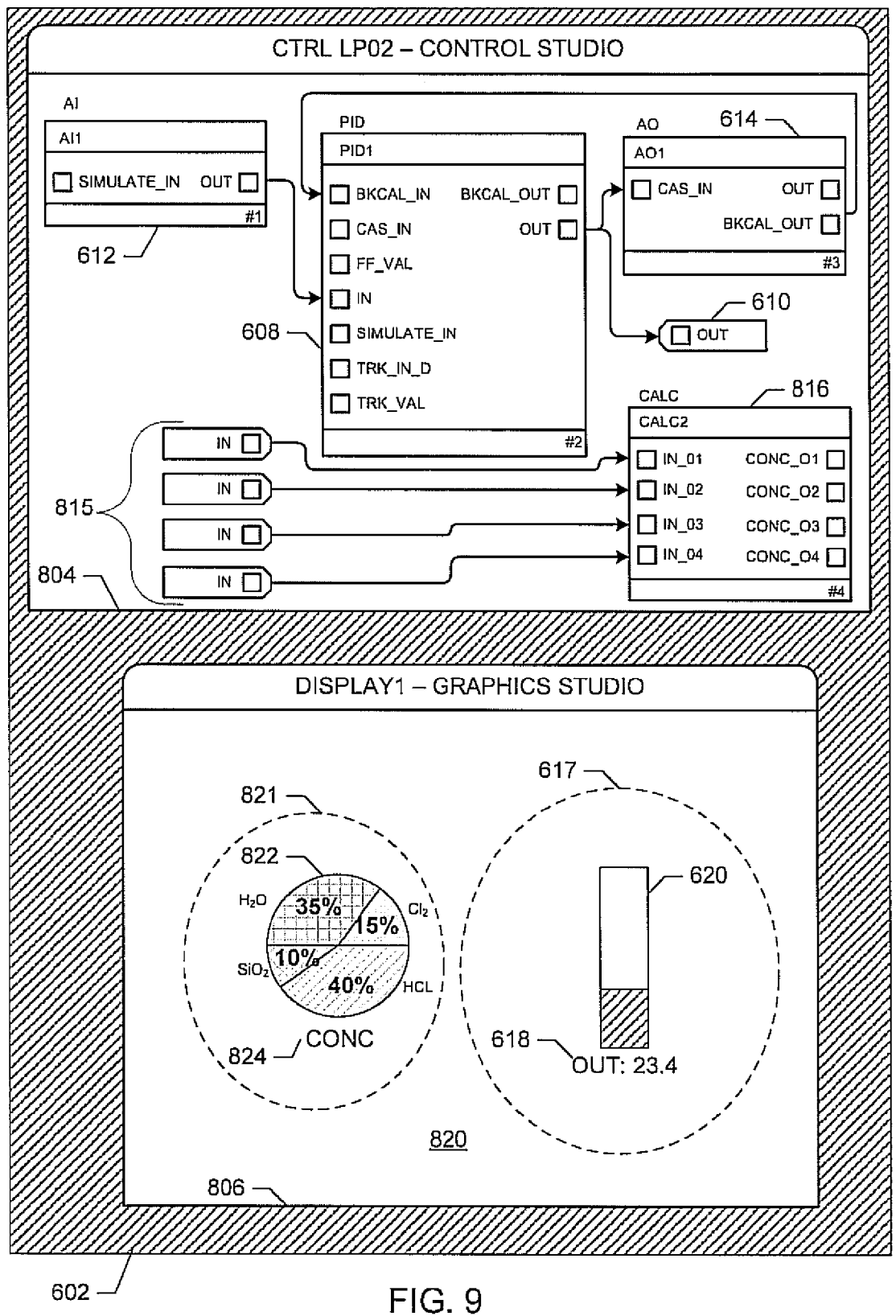
FIG. 9 illustrates the process control algorithm image of FIG. 8 and the process control graphic image of FIG. 8, which contains the two linked graphics.

FIG. 9 illustrates the process control algorithm image 804 of FIG. 8 and the process control graphic image 806 of FIG. 8. In FIG. 9, the process control graphic image 806 depicts the process control graphic image 806 of FIG. 8 with the output parameter 610 as automatically linked to a data source field associated with the graphic 617 and the four parameters within the concentration function 816 as automatically linked to a data source field associated with the second graphic 821. The automatic linking, which was initiated by selecting-and-dragging the output parameter 610 to the graphic 617 and the concentration function 816 to the second graphic 821, is performed by the auto path generator 514 of FIG. 5. As a result of the automatic linking, the data source field within the graphic 617 contains the path associated with the output parameter 610. Similarly, the four data source fields within the second graphic 821 contain paths associated with the four parameters within the concentration function 816. Thus, during runtime, the graphic 617 loads the data value associated with the parameter 610 in the data value field associated with the graphic 617. In the same manner, the second graphic 821 stores the data values associated with the four parameters within the concentration function 816 in the data value fields associated with the second graphic 821. Additionally, the text data representation 618 now displays a text value associated with the value within the data value field associated with the graphic 617. Similarly, the graphical data representation 620 now displays a portion of the bar filled to visually depict the value associated with the value within the data value field associated with the graphic. The second graphical data representation 822 now displays a pie chart visually depicting the values associated with the values within the data value field associated with the second graphic 821. Additionally, the second text data representation 824 now contains the numerical percentage values and the chemical types within the fluid. In this manner, the graphic 617 of FIG. 9 shows, for example, the fluid flow rate from the pump, and the graphic 821 of FIG. 9 shows, for example, the constituents of the fluid in the pump.

Figure 10:
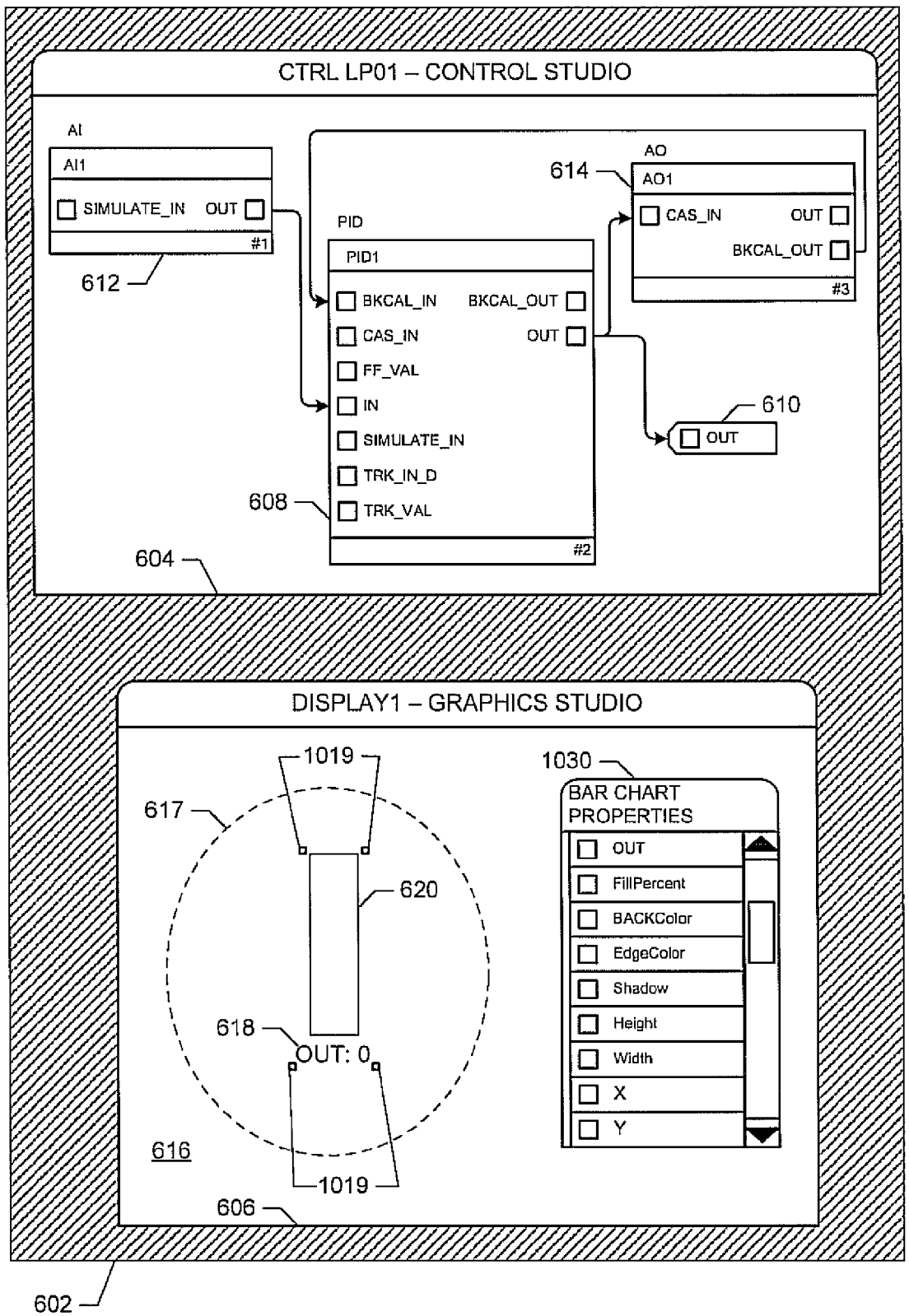
FIG. 10 illustrates the process control algorithm image of FIG. 6, the process control graphic image of FIG. 6, and a graphic property user interface.

FIG. 10 illustrates the process control algorithm image 604 of FIG. 6, the process control graphic image 606 of FIG. 6, and a graphic property user interface 1030. The process control algorithm information image 604 includes a process control algorithm including the functions 608, 612, and 614 coupled to create a feedback control algorithm. Although the control algorithm information image 604 is described as having one of each block described below, the process control algorithm information image 604 may include two or more of any block described below.

In the example implementation, the input function 612, the processing function 608, and the output function 614 are configured as described above in connection with FIG. 6. In this example implementation, the feedback control algorithm depicted in the process control algorithm image 604 is configured to provide flow control for a pump within a process control system. The process control algorithm includes the output parameter 610 that includes a path to the fluid flow rate from the pump referenced in the process control source address cache 506 of FIG. 5. The example process control graphic image 606 within the display 602 includes the graphic image area 616 not containing a graphic. The output parameter 610 has not yet been dragged and dropped into the process control graphic image 606.

The example process control graphic image 606 within the display 602 includes the graphic image area 616 containing the graphic 617 of FIG. 6, which includes the text data representation 618, and the graphical data representation 620. The graphic 617 may be loaded from the graphics cache 512 of FIG. 5 or created manually. The graphic 617 includes a highlight 1019 that includes four squares in close proximity to the graphic 617 indicating selection of the graphic 617. The graphic 617 may be selected by clicking on the graphic 617. In this example, by selecting the graphic 617 a system designer opens the graphic property user interface 1030 associated with the graphic 617. The graphic property user interface 1030 may be similar to the graphic property user interface 304 of FIG. 3.

In the example implementation, one or more of the functions 608, 612, 614 and/or the output parameter 610 may be dragged-and-dropped onto one or more of the properties within the graphic property user interface 1030. By dragging-and-dropping process control algorithm information onto a property within the graphic property user interface 1030, one or more data source fields within the property may be linked to the dragged-and-dropped process control algorithm information. Additionally a system designer may open a property within the graphic property user interface 1030 and drag-and-drop process control algorithm information onto a data source field within a property definition user interface such as, for example, the property definition user interface 307 of FIG. 3. In the example of FIG. 10, the graphic 617 is linked to a data value by selecting the output parameter 610, and dragging the output parameter 610 to and dropping it on the OUT property within the graphic property user interface 1030. Additionally, by dropping the parameter 610 onto the OUT property, the FillPercent property may automatically include the same link to the dragged-and-dropped parameter 610. The OUT property corresponds to the text data representation 618 and the FillPercent property corresponds to the graphical data representation 620.

Figure 11:
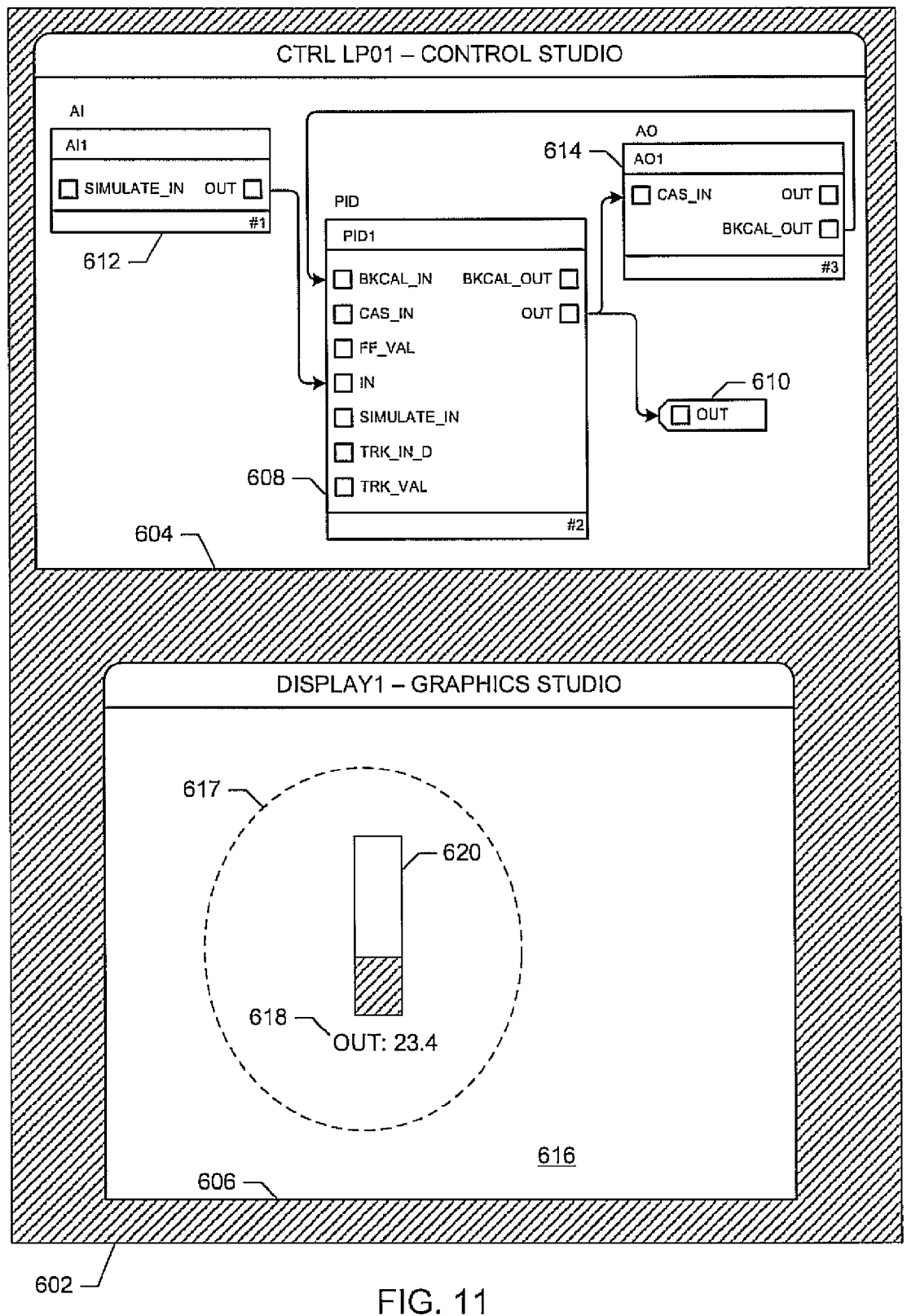
FIG. 11 illustrates the process control algorithm image of FIG. 6 linked to the process control graphic image of FIG. 6.

FIG. 11 illustrates the process control algorithm image 604 of FIG. 6 linked to the process control graphic image 606 of FIG. 6. In FIG. 11, the process control graphic image 606 depicts the process control graphic image 606 of FIG. 6 with the output parameter 610 as automatically linked to a data source field associated with the graphic 617. The automatic linking, which was initiated by selecting-and-dragging the output parameter 610 to the OUT property within the graphic property user interface 1030, is performed by the auto path generator 514 of FIG. 5. As a result of the automatic linking, the data source fields within the graphic 617 contain the path associated with the output parameter 610. Thus, during runtime, the graphic 617 stores the data value associated with this parameter 610 path into the data value field 310 associated with the graphic 617. Additionally, the text data representation 618 now displays a text value associated with the value within the data value field associated with the graphic 617. Similarly, the graphical data representation 620 now displays a portion of the bar filled to visually depict the value associated with the value within the data value field associated with the graphic 617. In this manner, the graphic 617 of FIG. 11 shows, for example, the fluid flow rate of the pump 112.

Figure 12:
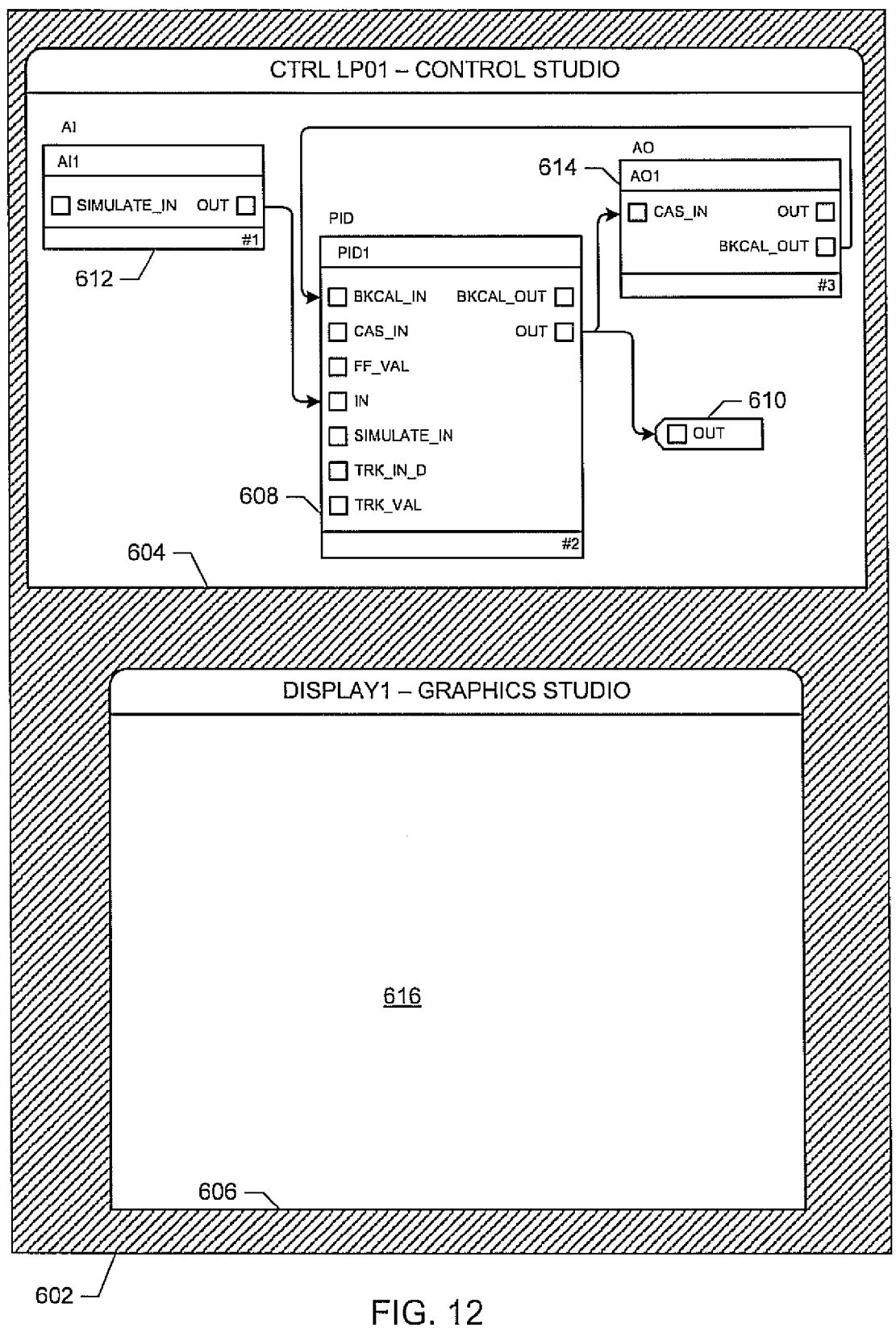
FIG. 12 illustrates the process control algorithm image of FIG. 6, and the process control graphic image of FIG. 6, which does not contain a graphic within the graphic image area.

FIG. 12 illustrates the process control algorithm image 604 of FIG. 6, and the process control graphic image 606 of FIG. 6, which does not contain a graphic within the graphic image area 616. The process control algorithm information image 604 includes a process control algorithm including the functions 608, 612, and 614 coupled to create a feedback control algorithm. Although the control algorithm information image 604 is described as having one of each block described below, the process control algorithm information image 604 may include two or more of any block described below.

In the example implementation, the input function 612, the processing function 608, and the output function 614 are configured as described above in connection with FIG. 6. In this example implementation, the feedback control algorithm depicted in the process control algorithm image 604 is configured to provide flow control for a pump within a process control system. The process control algorithm includes the output parameter 610 that includes a path to the fluid flow rate from the pump referenced in the process control source address cache 506 of FIG. 5. The example process control graphic image 606 within the display 602 includes the graphic image area 616 not containing a graphic. The output parameter 610 has not yet been dragged and dropped into the process control graphic image 606.

Figure 13:
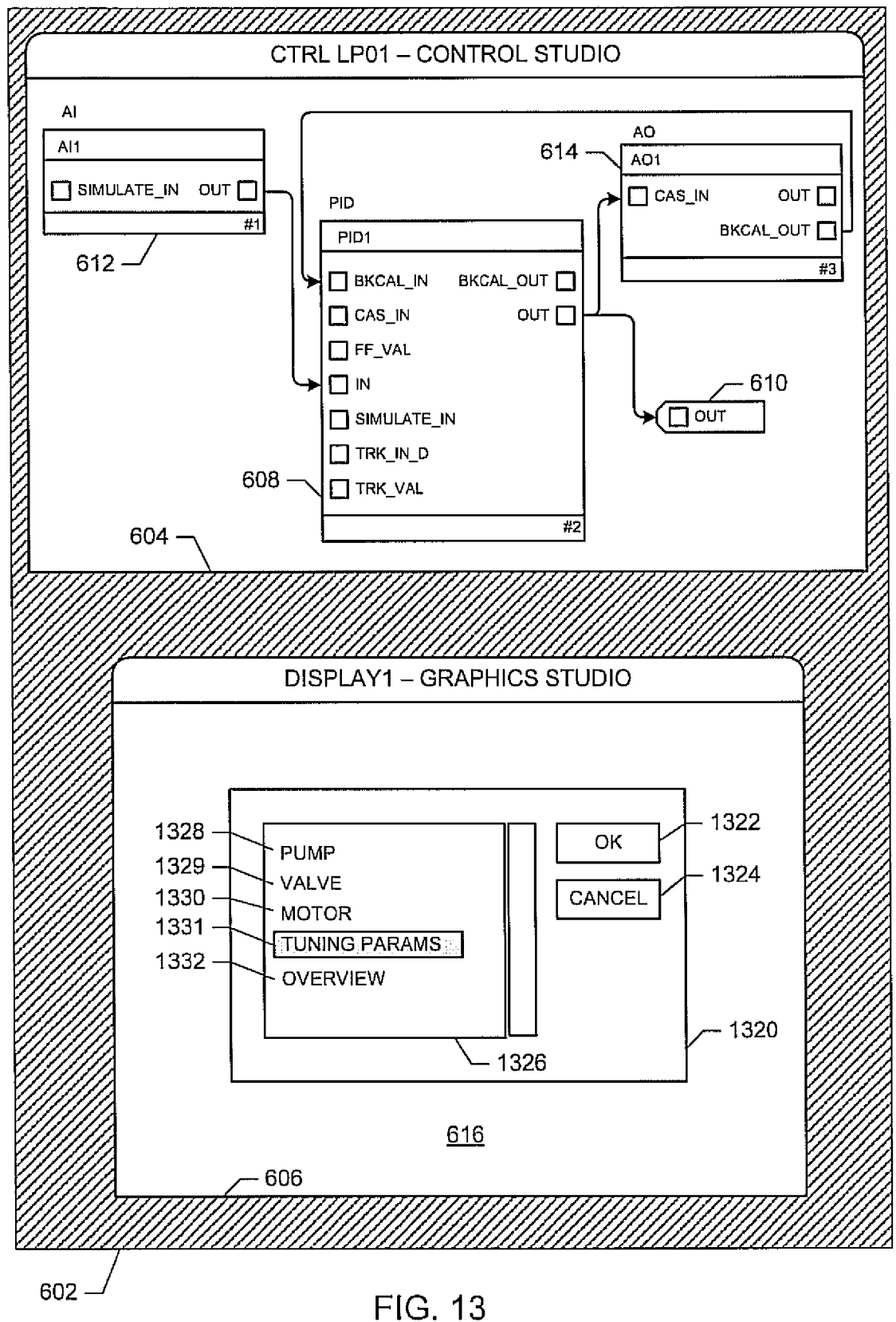
FIG. 13 illustrates the process control algorithm image of FIG. 6 and the process control graphic image of FIG. 6, which contains a graphical user interface list.

FIG. 13 illustrates the process control algorithm image 604 of FIG. 6 and the process control graphic image 606 of FIG. 6, which contains a graphical user interface prompt list 1320. The example graphical user interface prompt list 1320 includes an OK button 1322, a CANCEL button 1324, a graphics list box 1326, and graphics 1328-1332. The graphics 1328-1332 displayed in the graphics list box 1326 are transmitted from the graphics list filter 510 of FIG. 5 based on the function and/or parameters dragged-and-dropped into the graphic image area 616.

In the example of FIG. 13, the process control algorithm including the input function 612, the processing function 608, the output function 614, and the output parameter 610 of FIG. 12, have been selected and dropped into the graphic image area 616 of FIG. 12. The graphics list filter 510 determines the information contained within the input function 612, the processing function 608, the output function 614, and the output parameter 610 and filters graphics included in the graphics cache 512 that match or correspond to the dragged-and-dropped process control algorithm information. The matching or corresponding graphics 1328-1332 are displayed in the graphical user interface prompt list 1320. The graphics 1328-1332 may be displayed as text, visual graphical representations, or any other possible representation of graphics. In this example, the 'Tuning Params' graphic 1331 is selected. In other example implementations, multiple graphics may be selected. The selected graphic 1331 has not yet been linked to the process control algorithm information.

Figure 14:
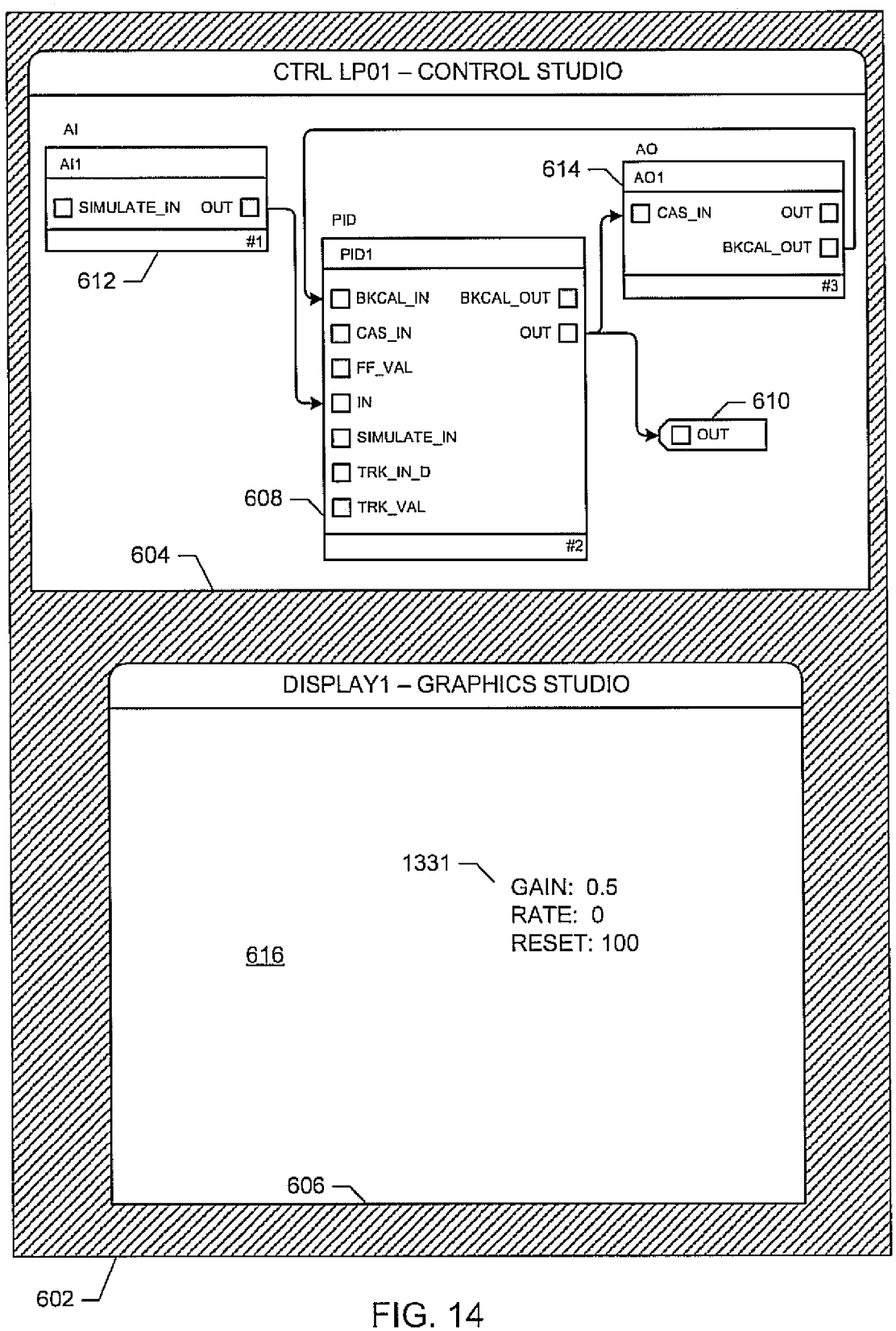
FIG. 14 illustrates a display containing the process control algorithm image of FIG. 6 and the process control graphic image of FIG. 6, which includes the visual representation of the graphic of FIG. 13.

FIG. 14 illustrates the display 602 of FIG. 6 containing the process control algorithm image 604 and the process control graphic image 606 of FIG. 6, which includes the visual representation of the graphic 1331 of FIG. 13. The graphic 1331 is automatically linked to one or more parameters and/or parameter(s) within one or more function(s) within the process control algorithm contained in the process control algorithm image 604. The graphic 1331 includes process control data values associated with GAIN, RATE, and RESET that may be loaded from the process control source address cache 506, calculated, and/or processed within the functions within the process control algorithm. In this example, the text data within the graphic 1331 contains a first data source field for RATE, a second data source field for GAIN, and a third data source field for RESET. The auto path generator 514 of FIG. 5 links paths from parameters within the input function 612, the processing function 608, and the output function 612 to the corresponding data source fields within the graphic 1331. In this example, the data source fields associated with the graphic 1331 are matched automatically by the auto path generator 514 to the process control algorithm information within the process control algorithm image 604. However, in another example implementation, there may be more than one possible parameter and/or function within a process control algorithm to link to a data source field within a graphic. In this case, the process graphic editor 504 may provide a list of possible parameters and/or parameter(s) within one or more function(s) that match the data source field within the graphic.

Figure 15:
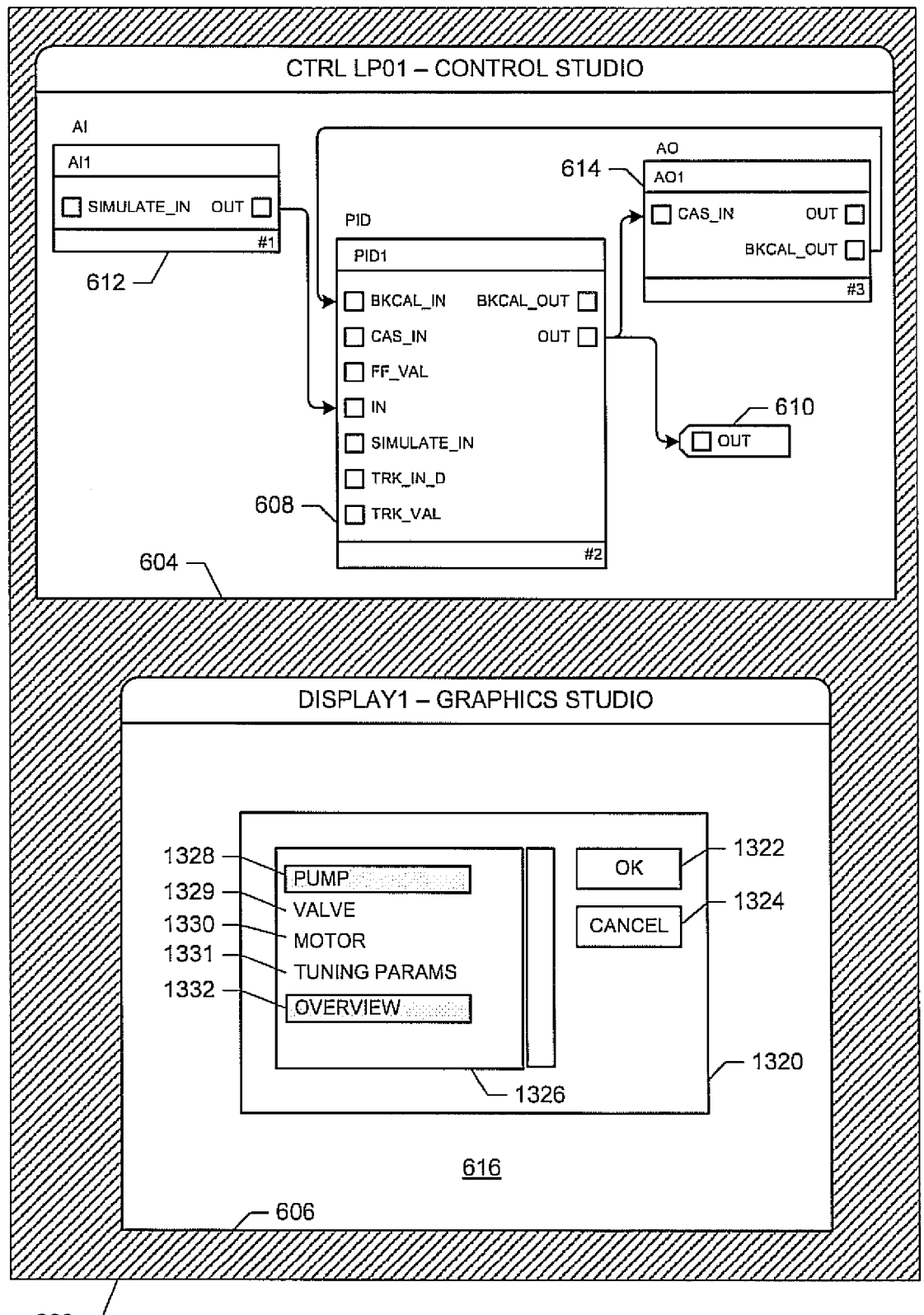
FIG. 15 illustrates the process control algorithm image of FIG. 12 and the process control graphic image of FIG. 12, which contains the graphical user interface list of FIG. 13.

FIG. 15 illustrates the process control algorithm image 604 of FIG. 12 and the process control graphic image 606 of FIG. 12, which contains the graphical user interface prompt list 1320 of FIG. 13. The example graphical user interface prompt list 1320 includes graphics 1328-1332. The graphics 1328-1332 displayed in the graphical user interface prompt list 1320 are transmitted from the graphics list filter 510 of FIG. 5 based on the function and/or parameters dragged-and-dropped into the graphic image area 616.

In the example, the process control algorithm including the input function 612, the processing function 608, the output function 614, and the output parameter 610 of FIG. 12, have been selected and dropped into the graphic image area 616 of FIG. 12. The graphics list filter 510 determines the information contained within the input function 612, the processing function 608, the output function 614, and the output parameter 610 and filters graphics included in the graphics cache 512 with property fields that match the dragged-and-dropped process control algorithm information, as described above in FIG. 12. The matching graphics 1328-1332 are displayed in the graphical user interface prompt list 1320. In the example of FIG. 15, the pump graphic 1328 and the overview graphic 1332 are selected. The pump graphic 1328 may display the fluid flow rate through a pump within a process control system controlled by the process control algorithm within the process control algorithm image 604. The overview graphic 1332 may display the fluid flow rate and the status within the same process control system as the pump within the process control algorithm image 604. The selected graphics 1328 and 1332 have not yet been linked to the process control algorithm information.

Figure 16:
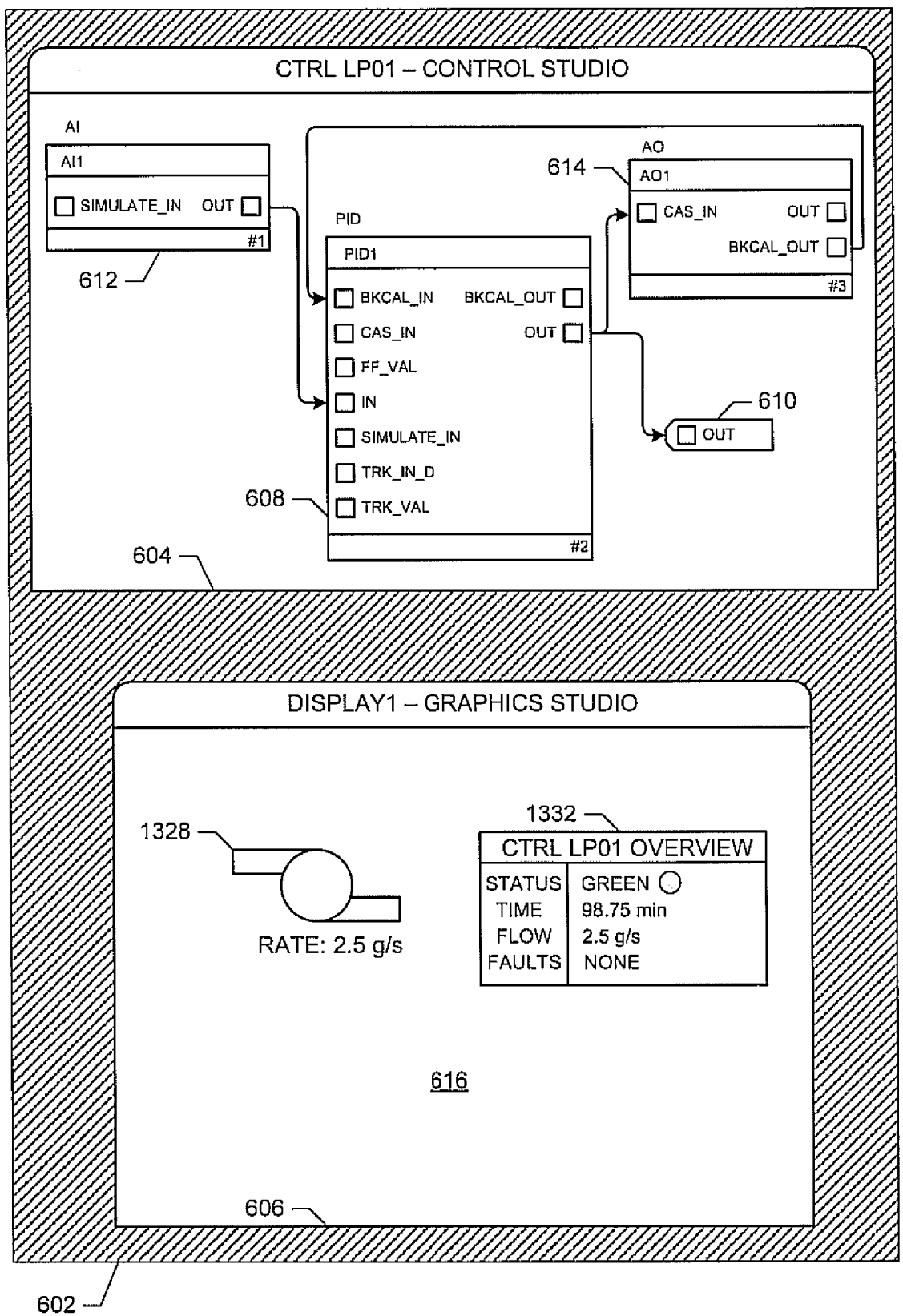
FIG. 16 illustrates a display containing the process control algorithm image of FIG. 12 and the process control graphic image of FIG. 12, which contains visual graphical representations of a pump graphic and a valve graphic.

FIG. 16 illustrates the display 602 containing the process control algorithm image 604 and the process control graphic image 604 of FIG. 12, which contains visual graphical representations the pump graphic 1328 and the overview graphic 1332. The pump graphic 1328 and the overview graphic 1332 are automatically linked to one or more parameters and/or functions within the process control algorithm contained in the process control algorithm image 604. In this example, the pump graphic 1328 displays a fluid flow of 2.5 g/s through a pump that may be associated with a data source parameter within the processing function 608, and the overview graphic 1332 displays a operational status of GREEN, a run time of 98.75 MIN, a fluid flow rate of 2.5 g/s, and a fault indicator of NONE that may be associated with more than one data source parameter within the processing function 608.

In this example, the text data within the overview graphic 1332 contains more than one data source field. The auto path generator 514 of FIG. 5 links paths from parameters within the input function 612, the processing function 608, and the output function 614 to the corresponding data source fields within the overview graphic 1332. Also, in this example, the data source fields associated with the overview graphic 1332 and the pump graphic 1328 are matched automatically by the auto path generator 514 to the process control algorithm information within the process control algorithm image 604. If there is more than one process control algorithm information match for the overview graphic 1332 or the pump graphic 1328, the process graphic editor 504 may prompt a system designer to specify which parameter to link to which graphic.

Figure 17:
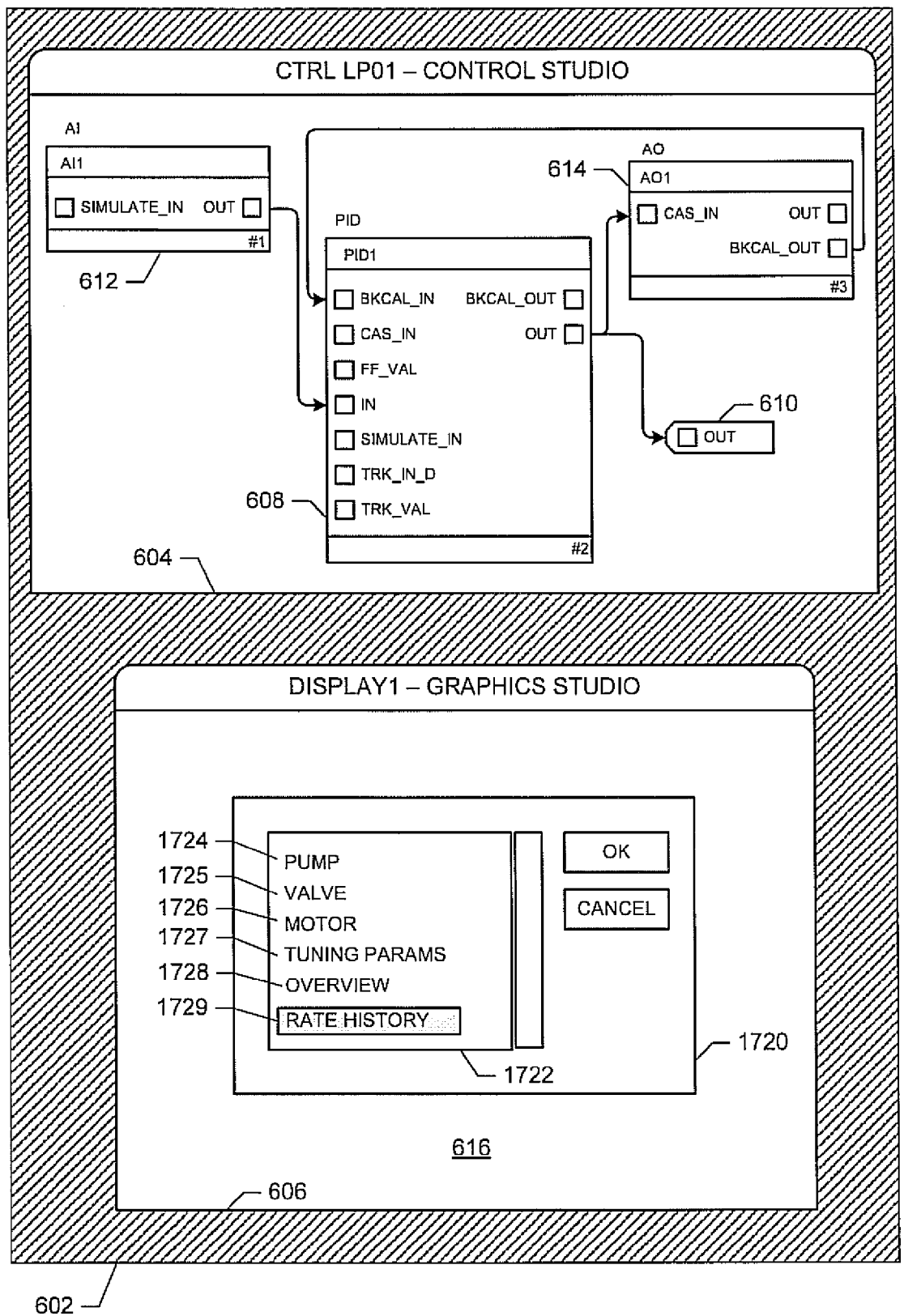
FIG. 17 illustrates the process control algorithm image of FIG. 12 and the process control graphic image of FIG. 12, which contains a graphical user interface list similar to the graphical user interface list of FIG. 13.

FIG. 17 illustrates the process control algorithm image 604 and the process control graphic image 606 of FIG. 12, which contains a graphical user interface prompt list 1720 similar to the graphical user interface prompt list 1320 of FIG. 13. The example graphical user interface prompt list 1720 includes graphics 1724-1729. The graphics 1724-1729 displayed in the graphical user interface prompt list 1720 are transmitted from the graphics list filter 510 of FIG. 5 based on the function and/or parameters dragged-and-dropped into the graphic image area 616 of FIG. 12.

In the example of FIG. 17, the process control algorithm including the input function 612, the processing function 608, the output function 614, and the output parameter 610 of FIG. 12, have been selected and dropped into the graphic image area 616 of FIG. 12. The graphics list filter 510 of FIG. 5 determines the information contained within the input function 612, the processing function 608, the output function 614, and the output parameter 610 and filters graphics included in the graphics cache 512 that match or correspond to the dragged-and-dropped process control algorithm information. The matching or corresponding graphics 1724-1729 are displayed in the graphical user interface prompt list 1720. In this example, the RATE HIST graphic 1729 is selected. The RATE HIST graphic 1729 may display pump fluid flow rate values over a specified time. The selected graphic 1729 has not yet been linked to the process control algorithm information.

Figure 18:
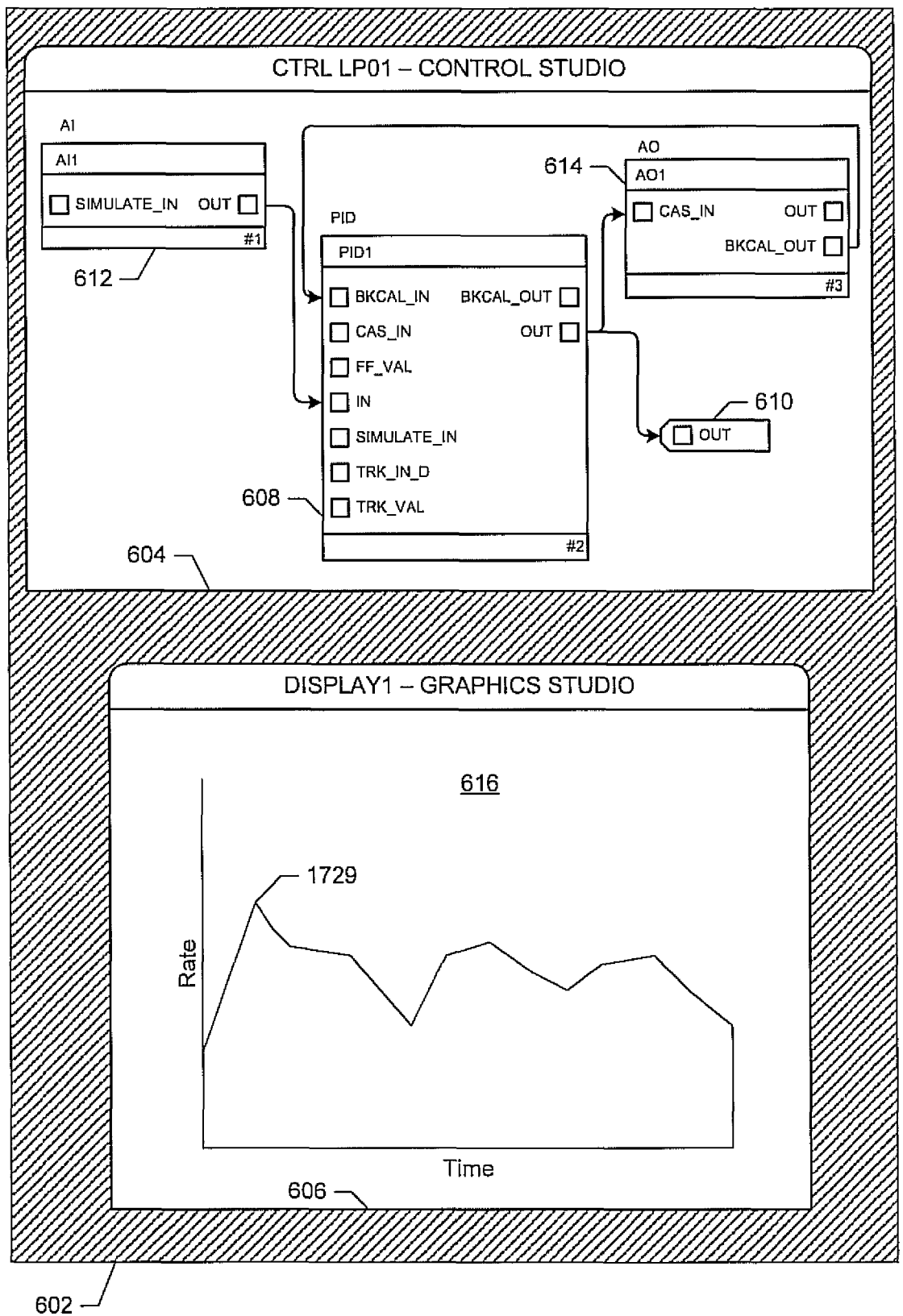
FIG. 18 illustrates a display containing the process control algorithm image of FIG. 12 and the process control graphic image of FIG. 12, which contains a visual graphical representation of the graphic.

FIG. 18 illustrates the display 602 containing the process control algorithm image 604 and the process control graphic image 606 of FIG. 12, which contains the visual graphical representation of the selected graphic 1729. The graphic 1729 may display the fluid flow rate over a specified time through, for example, the pump. The data source field associated with the chart graphic 1729 is automatically linked by the auto path generator 514 to one or more parameters and/or parameter(s) within one or more function(s) within the process control algorithm contained in the process control algorithm image 604. The process control algorithm may include a function and/or parameter within the processing function 608 that tracks the fluid flow rate over time. The fluid flow rate data may be stored in the process control source address cache 506 of FIG. 5.

Figure 19:
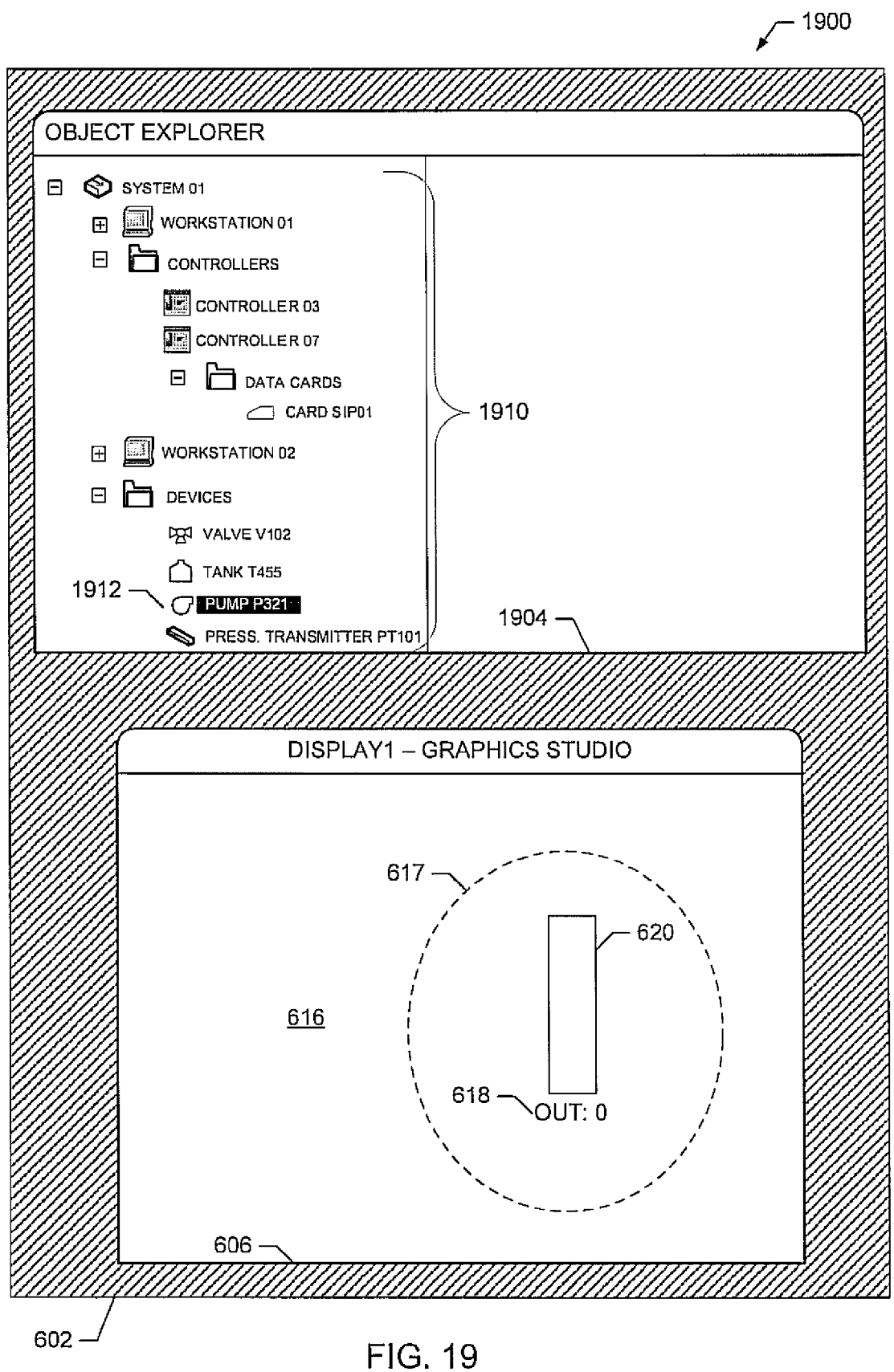
FIG. 19 illustrates a display containing a process control explorer image and the process control graphic image of FIG. 6.

FIG. 19 illustrates an example process control environment 1900 including the display 602 containing a process control explorer image 1904 and the process control graphic image 606 of FIG. 6. The process control explorer image 1904, named OBJECT EXPLORER, may be a graphical user interface, application window, etc. The process control explorer image 1904 displays process control hardware 1910 organized in a hierarchical structure. The process control explorer image 1904 enables a system designer to organize and/or browse hardware within a process control system. The process control hardware 1910 may include one or more process control systems, workstations, controllers, data cards, equipment, field devices, etc. The process control hardware 1910 may be dragged-and-dropped onto the graphic 617 in the same manner as process control algorithm information. In this example, a process control SYSTEM 01 includes WORKSTATION 01, WORKSTATION 02, a CONTROLLERS folder, and a DEVICES folder. The CONTROLLERS folder includes CONTROLLER 03, CONTROLLER 07, and data card CARD SIP01. The DEVICES folder includes process control equipment including a VALVE V102, a TANK T455, and a PUMP P321 1912. In addition, the DEVICES folder includes a PRESS. TRANSMITTER PT101. The PUMP P321 1912 may correspond to the pump 112 of FIG. 1, the CONTROLLER 03 may correspond to the controller 106, the WORKSTATION 01 may correspond to the workstation 102, and the PRESS. TRANSMITTER PT101 may correspond to the field device 110a. A system designer may click into and/or open any of hardware to view and/or edit configuration information, data source information, address information, setup information, etc.

The example process control graphic image 606 within the display 602 includes the graphic image area 616 containing the graphic 617 of FIG. 6, which includes the text data representation 618 and the graphical data representation 620. The graphic 617 may be loaded from the graphics cache 512 of FIG. 5 or created manually. In the example, the graphic 617 has not yet been linked to a data source. As a result, the text data representation 618 and the graphical data representation 620 are displayed with null data values.

In the example of FIG. 19, the PUMP P321 1912 is selected. The graphic 617 is linked to a data value by selecting the PUMP P321 1912, and dragging the PUMP P321 1912 to and dropping it on the graphic 617. In another example, hardware with multiple parameters such as, the CONTROLLER 03, may be dragged-and-dropped onto the graphic 617. In this case, the process graphic editor 504 of FIG. 5 may prompt a system designer to specify which parameter within the CONTROLLER 03 to link to the graphic 617.

In another implementation the graphic imagine area 616 may not contain a graphic. The process control hardware 1910 may be dragged-and-dropped to the graphic imagine area 616 similar to the example of FIG. 8. The process graphic editor 504 may prompt a system designer with a list of graphics corresponding to the dragged-and-dropped process control hardware 1910. The graphics list filter 510 may filter the list using parameters within the process control hardware 1910, and/or identification information associated with the process control hardware 1910.

Figure 20:
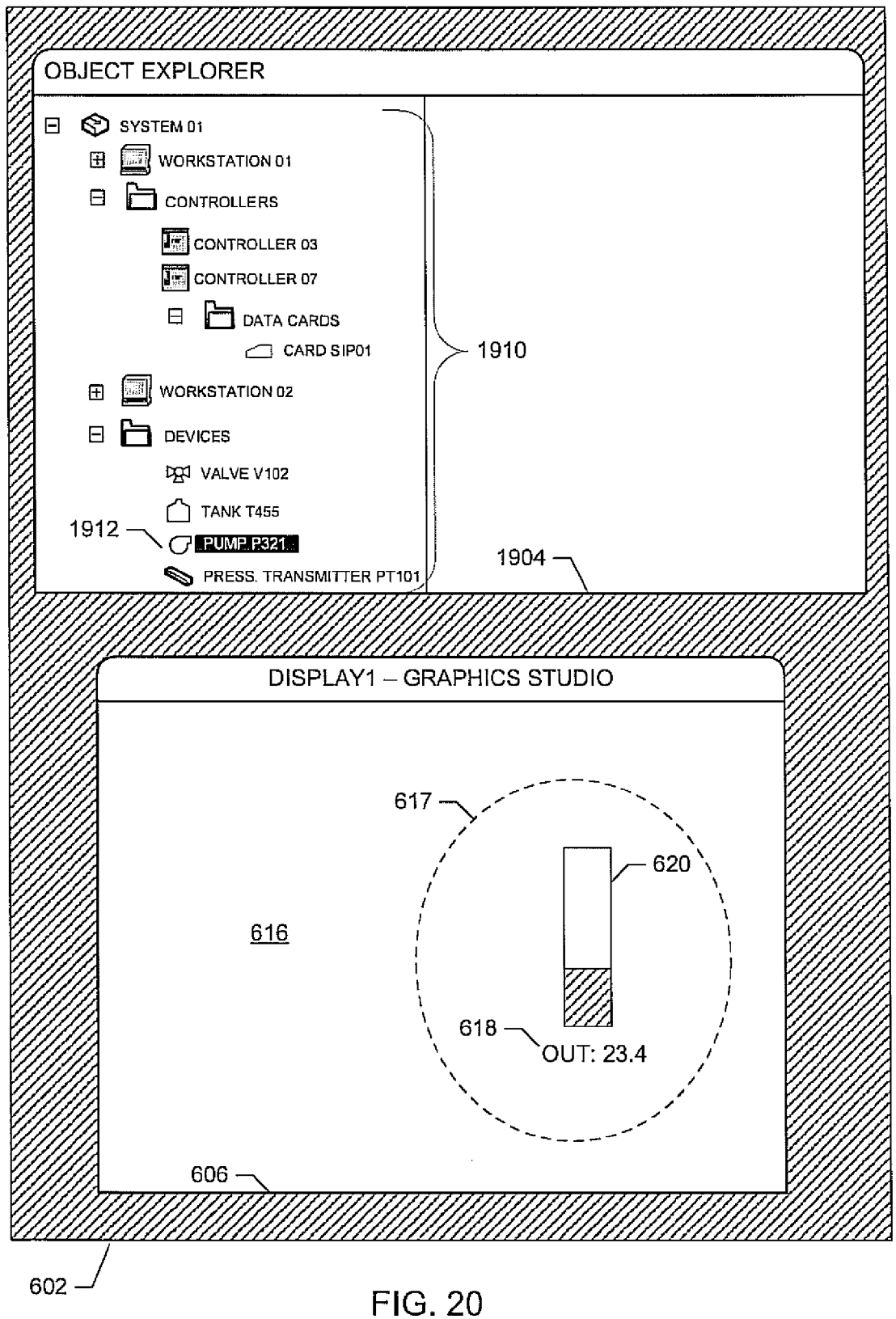
FIG. 20 illustrates the PUMP P321 with the process control explorer image of FIG. 19 linked to the process control graphic image of FIG. 6.

FIG. 20 illustrates the PUMP P321 1912 with the process control explorer image 1904 of FIG. 19 linked to the process control graphic image 606. The process control graphic image 606 depicts the process control graphic image 606 of FIG. 6 with PUMP P321 1912 as automatically linked to a data source field associated with the graphic 617. The automatic linking, which was initiated by selecting-and-dragging PUMP P321 1912 to the graphic 617, is performed by the auto path generator 514 of FIG. 5. As a result of the automatic linking, the data source fields within the graphic 617 contain the path associated with the PUMP P321 1912. Thus, during runtime, the graphic 617 stores the data value associated with this PUMP P321 1912 path into the data value field 310 associated with the graphic 617. Additionally, the text data representation 618 now displays a text value associated with the value within the data value field associated with the graphic 617. Similarly, the graphical data representation 620 now displays a portion of the bar filled to visually depicting the value associated with the value within the data value field associated with the graphic 617. In this manner, the graphic 617 of FIG. 20 shows, for example, the fluid flow rate of the pump 112 associated with the PUMP P321 1912 of FIG. 19.

Figure 21:
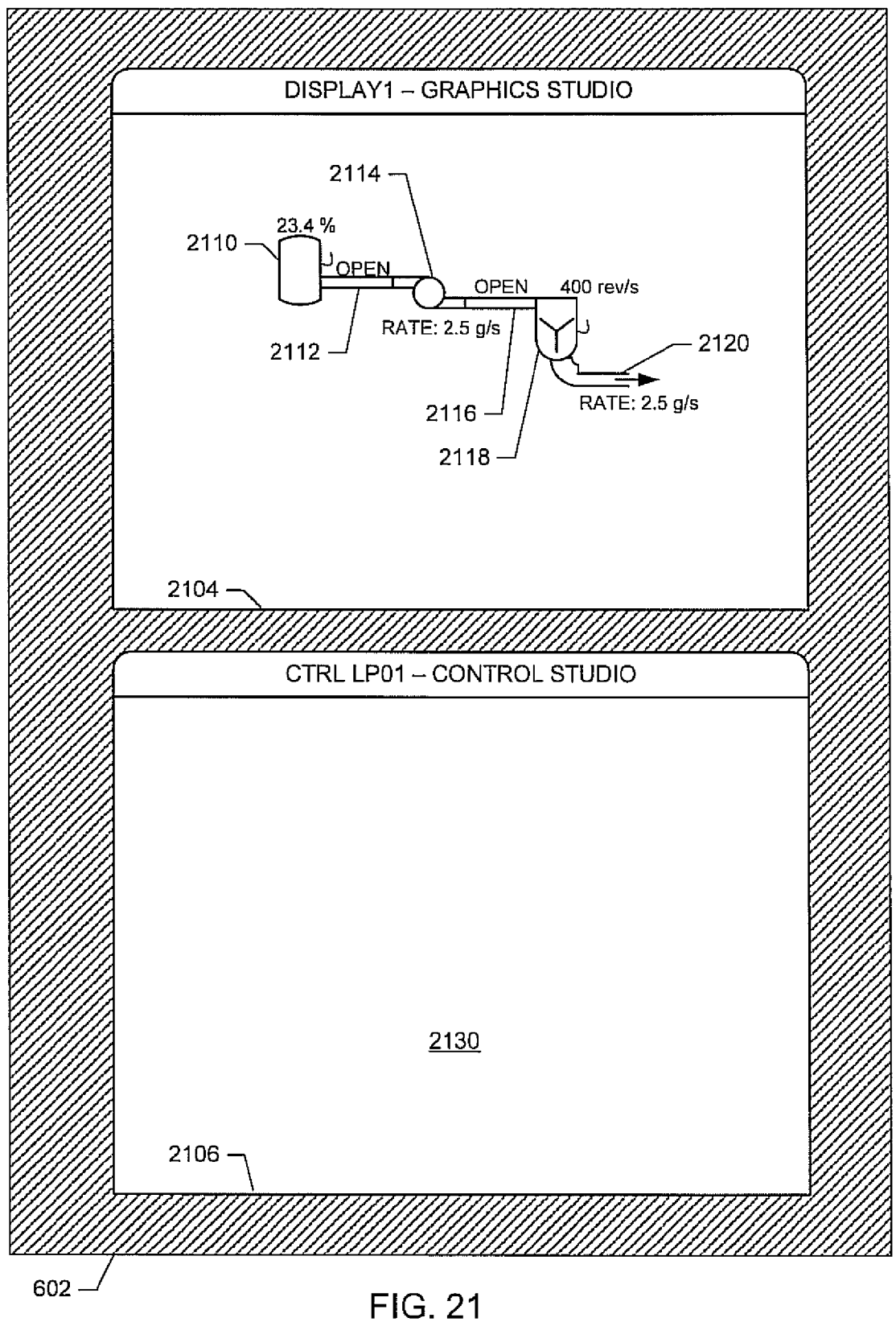
FIG. 21 illustrates a process control graphic image that contains graphics and a process control algorithm image, which does not contain a process control algorithm.

FIG. 21 illustrates a process control graphic image 2104 which contains graphics 2110-2120 and a process control algorithm image 2106, which does not contain a process control algorithm. The graphics 2110-2120 within the process control graphic image 2104 are already linked to process control algorithm information within the process control source address cache 506 of FIG. 5. Additionally, the process control algorithm image 2106 does not contain a process control algorithm. In this example, a system designer may have created the process control graphics 2110-2120 within the process control graphic image 2104 and linked the process control algorithm information within the process control source address cache 506 to data source fields within the process control graphics 2110-2120. The system designer may drag-and-drop the process control graphics 2110-2120 into the process control algorithm image 2106 to create a process control algorithm and automatically link the process control algorithm and the process control graphic.

The process control graphic image 2104 includes a process control graphic containing a tank 2110, a tank-pump pipe 2112, a pump 2114, a pump-mixer pipe 2116, a mixer 2128, and an outflow pipe 2120. The process control graphics 2110-2120 may be included in a graphical interface for a system operator providing process information on the tank-pump-mixer system. The information may include text and/or graphics displaying the fluid flow rate, pipe status, mixer speed, etc. in association with the tank 2110, the tank-pump pipe 2112, the pump 2114, the pump-mixer pipe 2116, the mixer 2118, and/or the outflow pipe 2120. Although the control algorithm information image 2104 is described as having one of each graphic described below, the process control algorithm information image 2104 may include two or more of any graphic or additional graphics.

The example process control algorithm image 2106 within the display 602 includes the function image area 2130. However, the function image area 2130 does not yet contain functions and/or parameters. Functions and/or parameters may be automatically created within the function image area 2130 by selecting the graphics 2110, 2112, 2114, 2116, 2118, and/or 2120 within the process control algorithm in the process control graphic image 2104, and dragging and dropping the selected graphics onto the function image area 2130 of the process control graphic image 2106. Each selection may be dragged-and-dropped individually or as a group. In the same manner as the auto path generator 514 of FIG. 5 automatically links graphics to process control algorithm information, the auto path generator 514 may automatically link parameters and/or parameters within one or more functions to process control algorithm information within the data source fields of graphics.

Figure 22:
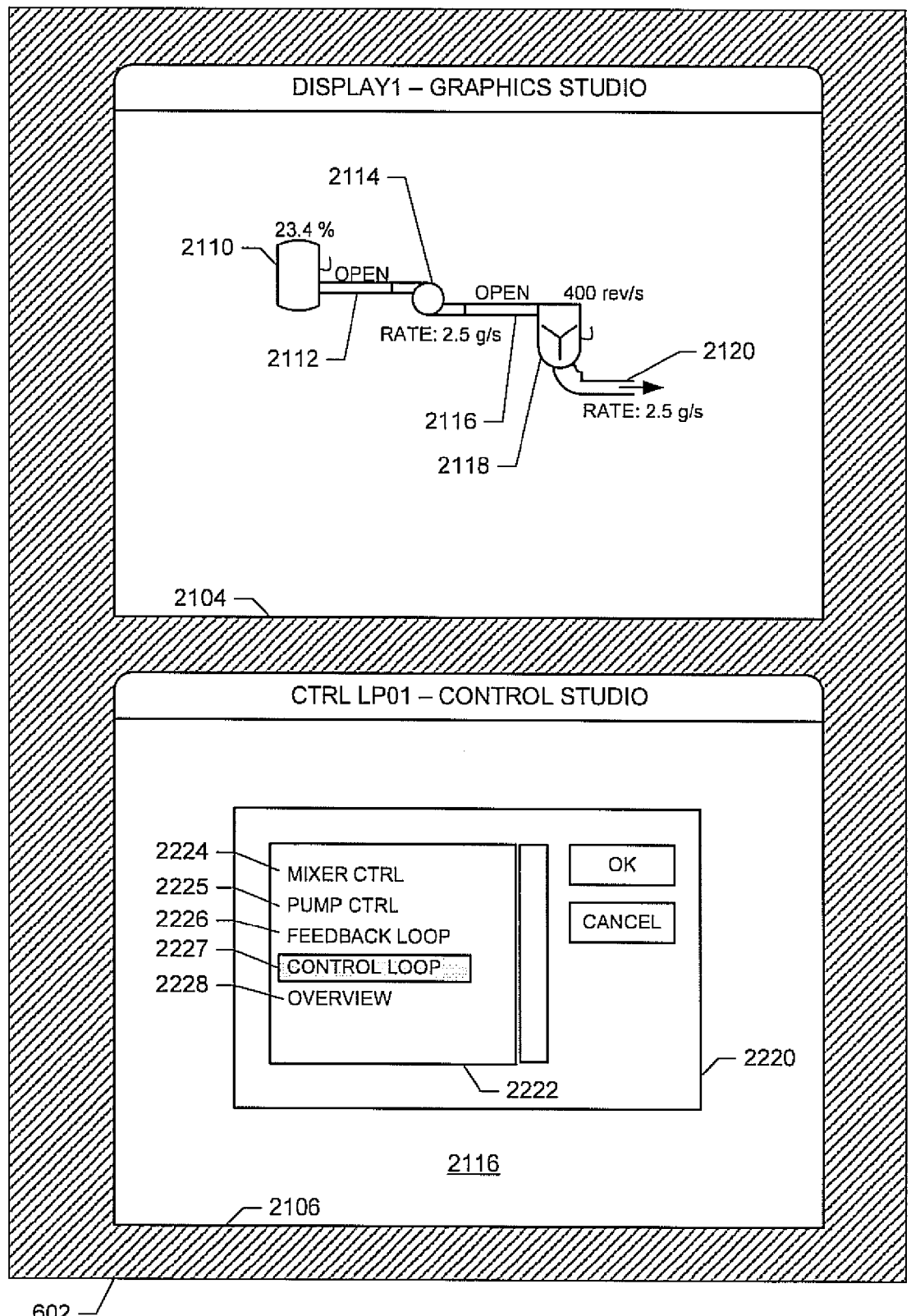
FIG. 22 illustrates the process control graphic image of FIG. 21 and the process control algorithm image of FIG. 21, which contains graphical user interface list.

FIG. 22 illustrates the process control graphic image 2104 and the process control algorithm image 2106 of FIG. 21, which now contains a graphical user interface list 2220. The example graphical user interface list 2220 is similar to the example graphical user interface prompt list 1320 of FIG. 13. The graphical user interface list 2220 includes a function list box 2222, and functions 2224-2228. The functions 2224-2228 displayed in the function list box 2222 may be transmitted from a function list filter similar to the graphics list filter 510 of FIG. 5 and correspond to the graphics dragged-and-dropped onto the function image area 2130.

In the example of FIG. 22, the process control algorithm including the tank 2110, the tank-pump pipe 2112, the pump 2114, the pump-mixer pipe 2116, the mixer 2128, and the outflow pipe 2120 of FIG. 21, are selected and dropped on to the graphic image area 2130. The function list filter determines the type of information contained within the tank 2110, the tank-pump pipe 2112, the pump 2114, the pump-mixer pipe 2116, the mixer 2128, and/or the outflow pipe 2120 and filters functions stored in a function cache with fields that match or correspond to fields and/or information within properties of the dragged-and-dropped graphics 2110-2120. The matching or corresponding algorithms and/or the functions 2224-2228 are displayed in the graphical user interface list 2220. The algorithms and/or the functions 2224-2228 may be displayed as text, visual graphical representations, or any other possible representation of the algorithms and/or functions 2224-2228. In this example, the CTRL LOOP algorithm 2227 is selected. In other example implementations, multiple and/or different functions may be selected.

Figure 23:
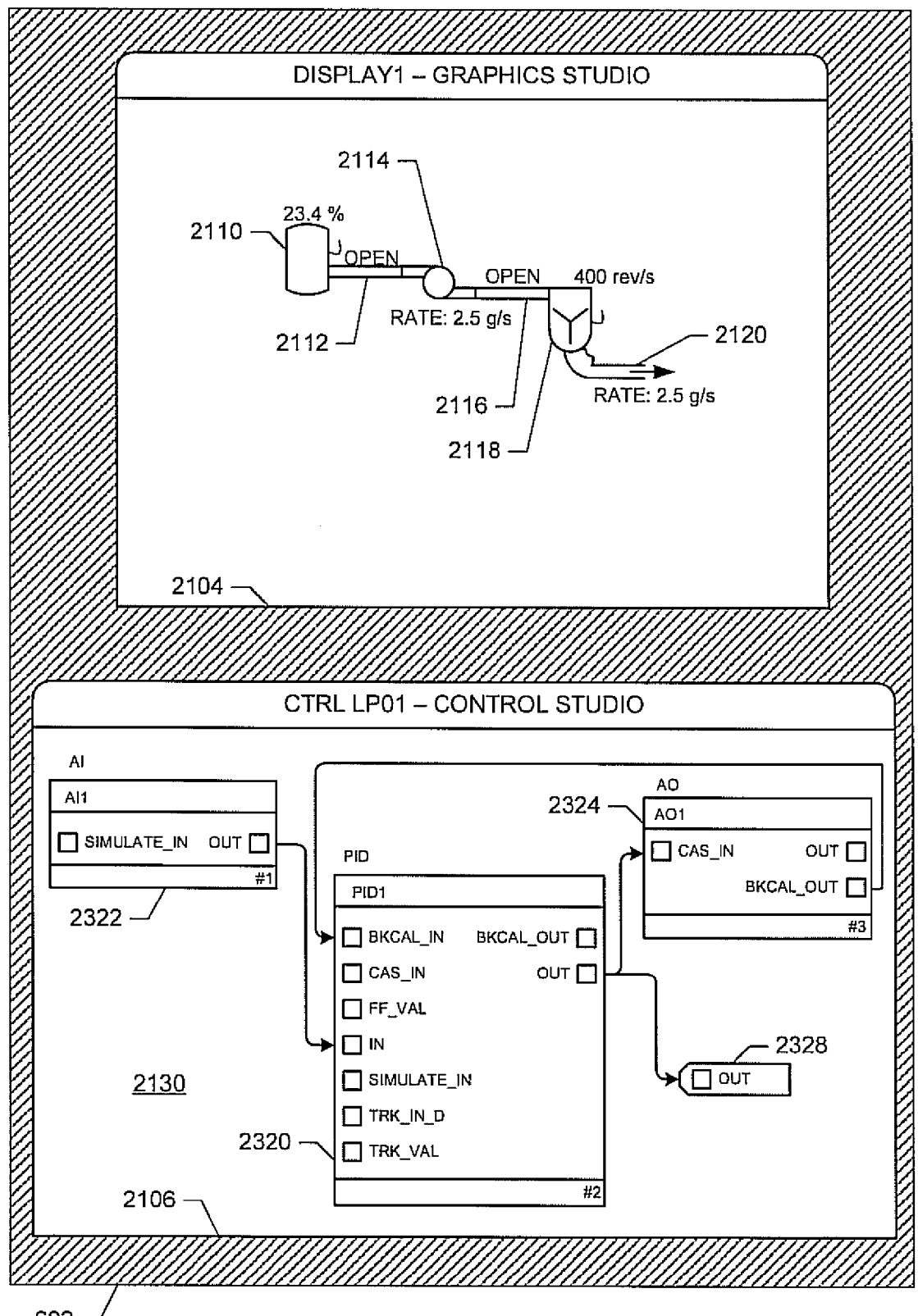
FIG. 23 illustrates a display containing the process control graphic image of FIG. 21 and the process control algorithm image of FIG. 21, which contains a process control algorithm.

FIG. 23 illustrates the display 602 containing the process control graphic image 2104 and the process control algorithm image 2106 of FIG. 21, which now contains a process control algorithm. The process control algorithm image 2106 corresponds to the CTRL LOOP algorithm 2227 selected from the function list 2220. The CTRL LOOP 2227 algorithm includes an input function 2322, a processing function 2320, an output function 2324 and a parameter 2328 associated with an output of the processing function 2320. The process control CTRL LOOP 2227 algorithm has been automatically linked to process control algorithm information with the graphics 2110-2120 of the process control graphic image 2104. In this example, the input function 2322, the processing function 2320, the output function 2324 and the parameter 2328 are loaded from the function cache. The data source fields within parameters associated with the input function 2322, the processing function 2320, the output function 2325 and the parameter 2328 are automatically linked to the process control source address cache 506 by the auto path generator 514 of FIG. 5.

FIGS. 24A-24D and 25 are flowcharts representative of example methods of processes that may be performed to create and automatically link process control graphics to process control algorithm information. The example methods may be implemented using machine readable instructions, code, software, etc. that is executed using, for example, a processor system such as the system 2600 of FIG. 26. However, the one or more of the blocks depicted in the flowcharts may be implemented in any other manner, including dedicated purpose circuitry, manual operations, etc. Additionally, although the example methods are described with reference to the flowcharts of FIGS. 24A-24D and 25, other methods of creating process control graphics based on process control algorithm information may additionally or alternatively be used. For example, the order of execution of the blocks depicted in the flowcharts of FIGS. 24A-24D and 25 may be changed, and/or some of the blocks described may be rearranged, eliminated, or combined.

In particular, example methods 2400, 2431, 2450, and/or 2479 of FIGS. 24A-24D may be performed to implement the example process graphic editor 504 of FIG. 5, the process control algorithm compiler 502 and/or the auto path generator 514. The example methods 2400, 2431, 2450, and/or 2479 may be executed at predetermined intervals, based on an occurrence of a predetermined event, etc., or any combination thereof. For example, the methods 2400, 2431, 2450, and/or 2479 may be executed in a design environment upon start-up of the process graphic editor 504, process control algorithm compiler 502 and/or the auto path generator 514, at predetermined intervals, such as hourly, daily, etc. Additionally or alternatively, the example methods 2400, 2431, 2450, and/or 2479 may be executed upon the occurrence of a trigger generated remotely, for example, at the process graphic editor 504 when process control algorithm information is dragged-and-dropped from the process control algorithm compiler 502.

The method 2400 begins at block 2402 where process control algorithm information is selected within a process control algorithm image. In block 2404, the selected process control algorithm information is then dragged and dropped onto a process control graphic image. In addition to a drag-and-drop action, other example actions may include a select-and-paste, a copy-and-paste, a lasso-and-drop, highlight-and-inset, etc.

Control then proceeds to block 2406 where the process graphic editor 504 of FIG. 5 compiles the process control algorithm information dropped into the process control graphic image. In block 2408, the process graphic editor 504 determines if the process control algorithm information dropped into the process graphic editor 504 was dropped specifically onto a graphic within the process graphic editor 504. If the process control algorithm information was dropped onto a graphic, control proceeds to block 2412, otherwise control proceeds to block 2452, where in FIG. 24C a method 2450 is performed to display a filtered list of graphics.

Figure 24A:
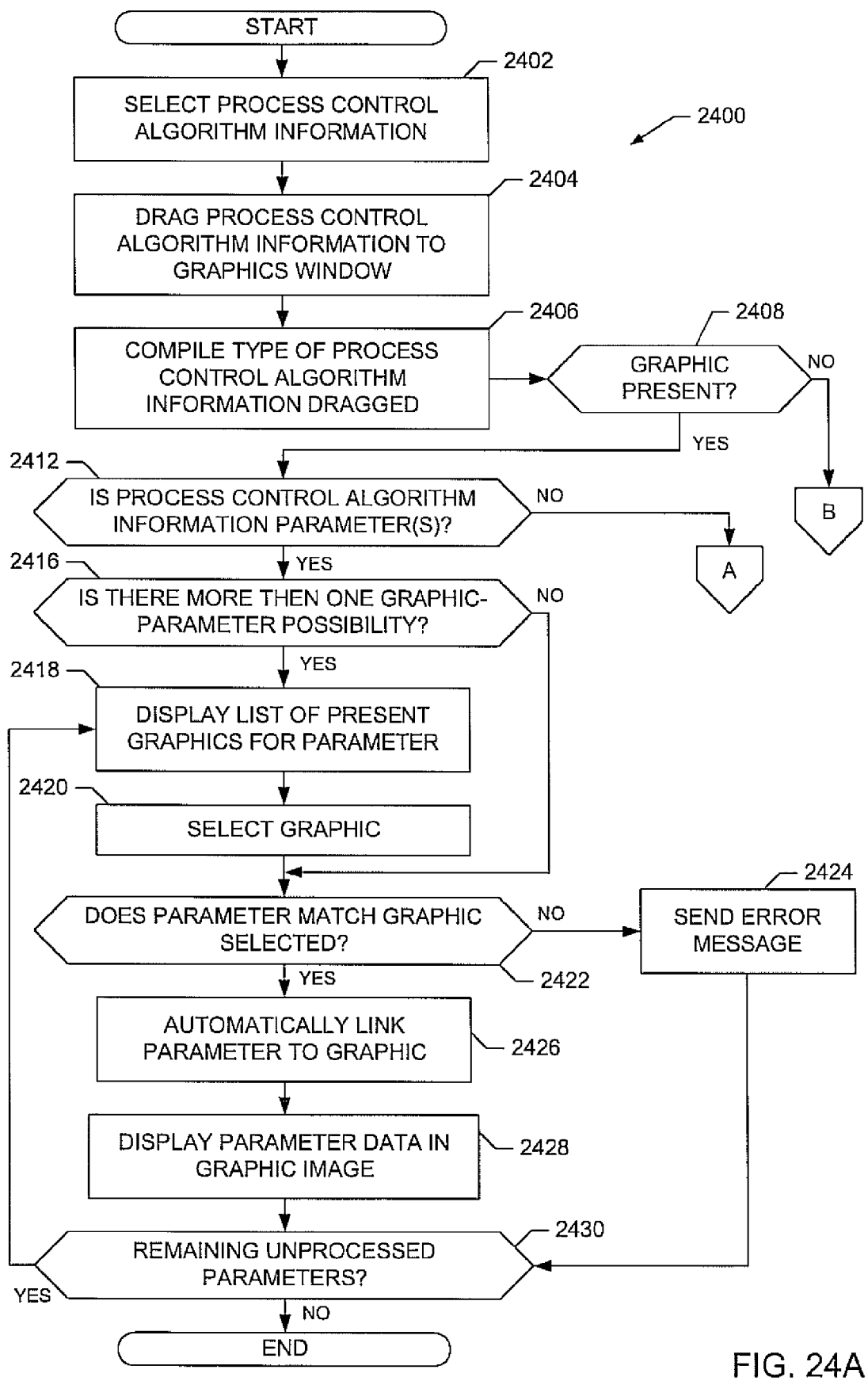
FIGS. 24A-24D are flow diagrams depicting an example method that may be used to automatically link process control algorithm information to process control graphics.

In block 2412 of FIG. 24A, the process graphic editor 504 of FIG. 5 determines if the dragged-and-dropped process control algorithm information includes one or more parameters. If the process control algorithm information includes one or more parameters, block 2416 is executed. If the process control algorithm information contains at least one function, control proceeds to block 2432 of FIG. 24B. In block 2416 the process graphic editor 504 determines if there is more than one combination the dragged-and-dropped parameter(s) with the graphic(s). If there is at most one combination, block 2422 is executed. If there is more than one parameter-graphic combination, block 2418 is executed, at which the process graphic editor 504 queues the parameters and displays a list of graphics within the process graphic editor 504 that can be linked to the parameter. In this example implementation, the process graphic editor 504 displays a list of all remaining graphics within the process graphic editor 504 that have data source fields that may be linked to one or more parameters. In another possible implementation, the process graphic editor 504 filters the list of graphics within the process graphic editor 504 based on the type of parameter. In the case a parameter contains more than one data source field, the process graphic editor 504 may display a list of the data source fields within the parameter for a system designer to select which field(s) to link.

Next, in block 2420, a graphic from the list is selected and control proceeds to block 2422 where the process graphic editor 504 determines if the data source associated with the parameter matches or corresponds to the data source type of the data source field associated with the graphic. For example, if a parameter contains the status of a pump, as OFF, ON, or percent ON, and the data type field associated with the graphic is configured to contain a decimal value, the process graphic editor 504 may detect this mismatch in data types and send an error message (block 2424). If the data source type of the parameter matches the data type field and any other information associated with the graphic, control proceeds to block 2426. In block 2426, the auto path generator 514 automatically links the data source field associated with the graphic with data within the parameter. Then, in block 2428, the graphic displays the linked algorithm information contained in the data source field. The graphic display could be, for example, text, numerical values, graphical information, etc. Next in block 2430, the process graphic editor 504 checks for any remaining parameters that have been dragged-and-dropped to the process control graphic image, but which have not yet been linked to a graphic. In the case where a parameter is processed through block 2422 and the process graphic editor 504 determines there is a data source mismatch, the parameter may be considered processed and may not be considered as an un-linked parameter in block 2430. If there are remaining unprocessed parameters, control loops back to block 2418 where the list of reaming graphics is displayed for the next parameter. If there is not at least one parameter remaining in queue, the method 2400 ends.

Figure 24B:
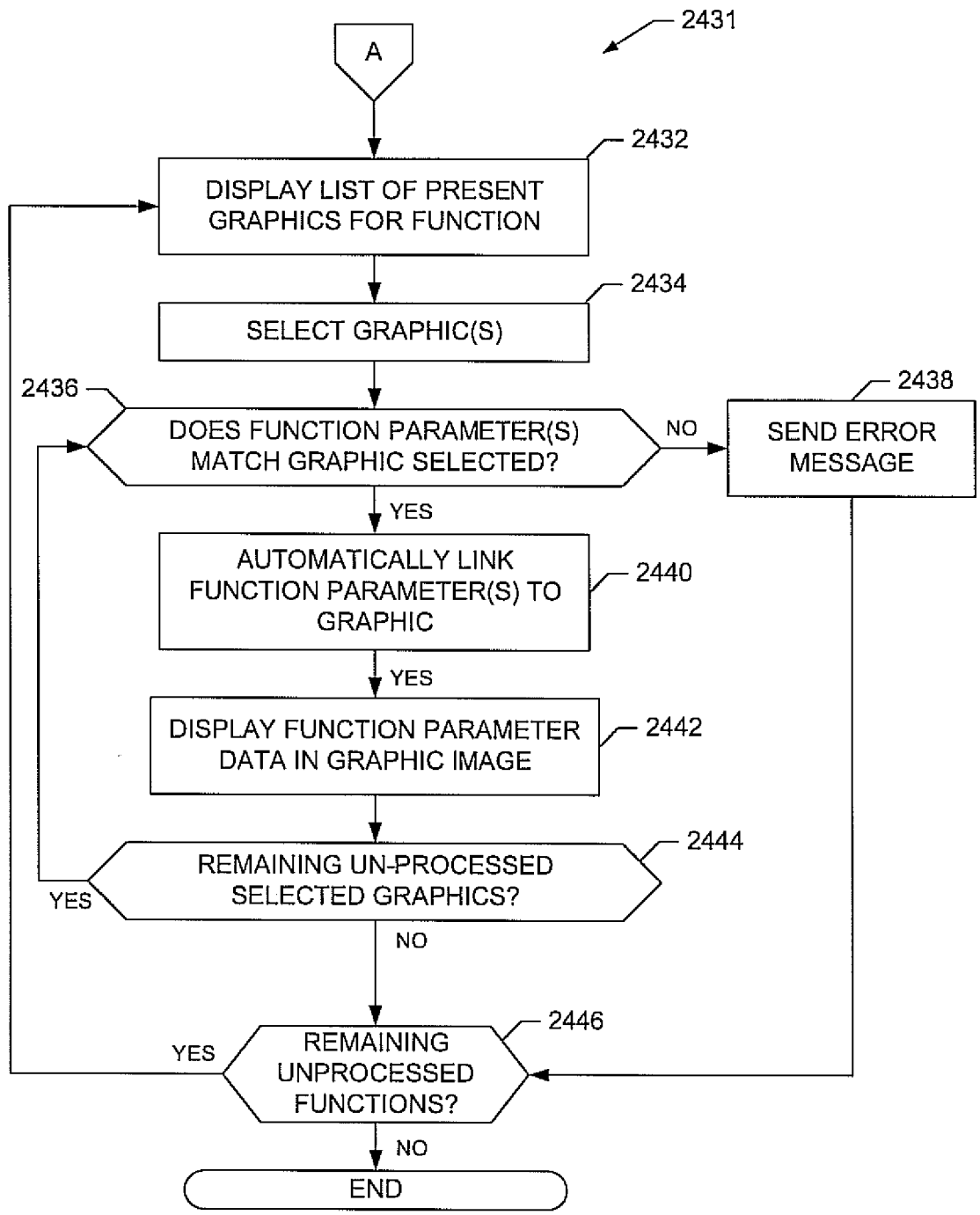

In block 2432 of FIG. 24B, the method 2431 associated with the process graphic editor 504 displays the list of graphics within the process control graphic image that match or correspond to the parameter(s) within the one or more functions. Then, in block 2434 the graphic(s) are selected that are to be linked to the dragged-and dropped process control algorithm parameter(s) within the one or more functions. In an example, a function and parameter may be dragged-and-dropped onto multiple graphics within the process control graphic image. Decision block 2414 was executed because the process control algorithm information included at least one function. In this case, the process graphic editor 504 processes the function and parameter within the corresponding method 2431. The process graphic editor 504 queues any parameters to be processed with the parameter(s) within one or more functions.

Control proceeds to block 2436, at which the process graphic editor 504 determines if the data source associated with the function(s) matches the data type field or any additional information associated with the selected graphic(s). If the process graphic editor 504 detects a mismatch in data types an error message is sent (block 2438). If the data source type of the parameter(s) within one or more functions matches the data source property associated with the graphic(s), control proceeds to block 2440. In block 2440, the auto path generator 514 automatically links the data source property associated with the graphic(s) to the data source within the function(s).

Then in block 2442, the selected graphic(s) displays the linked algorithm information contained in the data source property field. The graphic display could be, for example, text, numerical values, graphical information, etc. Next, in block 2444, the process graphic editor 504 checks for any remaining functions and/or parameters that have been dragged-and dropped to the process control graphic image, but which have not yet been linked to a graphic. In the case where a function and/or parameter(s) within one or more functions is processed through block 2436 and the process graphic editor 504 determines there is a data source mismatch, the function may be considered processed and may not be considered as an un-linked parameter in block 2446. If there are remaining unprocessed functions and/or parameters, control loops back to block 2432 where the list of reaming graphics is displayed for the next function and/or parameter. If all of the parameters dragged to the process control graphic image are processed, the method 2431 ends.

Figure 24C:
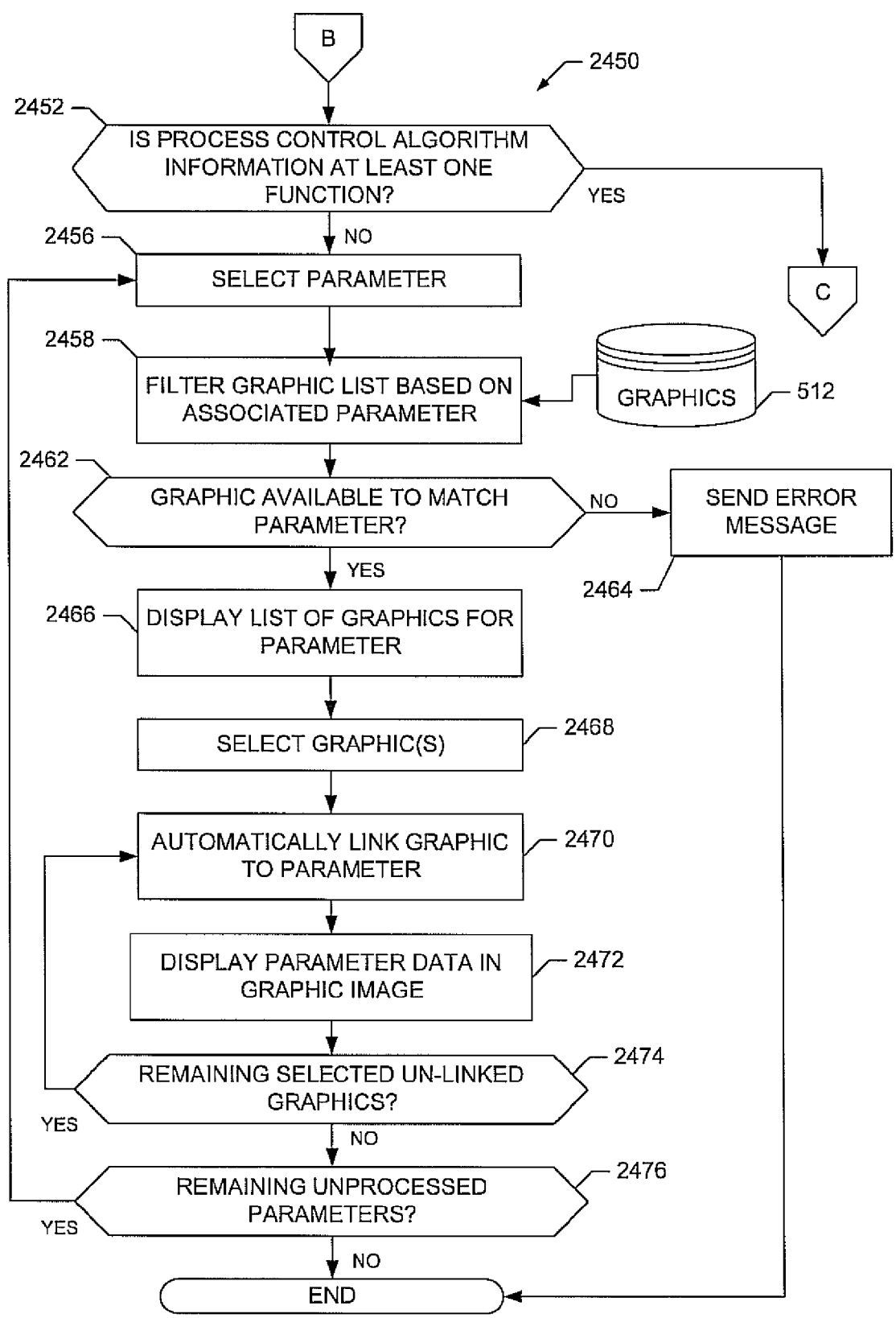

In block 2452 of FIG. 24C, the method 2450 associated with the process graphic editor 504 determines if the process control algorithm information dragged-and-dropped to the process graphic editor 504 contains at least one function. If the process control algorithm information includes at least one function, control proceeds to block 2480 of FIG. 24D to create and automatically link at least one graphic to the process control algorithm information including the parameter(s) within the one or more functions. If the process control algorithm information does not contain at least one function control proceeds to block 2456. In block 2456 the process graphic editor 504 queues the dragged-and-dropped parameter(s) and processes the next one in line. Then, in block 2458, the process graphic editor 504 relays the parameter info to the graphics list filter 510, where the graphics list filter 510 accesses the graphics cache 512 and selects the graphics that match the data source properties of the parameter. Control then proceeds to block 2462 where the process graphic editor 504 processes the list of graphics returned from the graphics list filter 510. If there is not at least one graphic on the list, block 2464 is executed where an error message is sent.

If there is at least one matching graphic in the filtered list, control proceeds to block 2466 where the process graphic editor 504 displays the filtered list of graphics. Then, in block 2468, one or more of the graphics are selected. Next, in block 2470, the selected graphics are queued and the data source field associated with the next graphic in line is automatically linked to the parameter by the auto path generator 514. Then, in block 2472, the graphic displays the data contained in its associated data source field. Next, in block 2474, the auto path generator 514 checks if there are remaining graphics in queue. If there is at least one graphic, control loops back to block 2470 and the next graphic in line is automatically linked to the parameter. If there is not at least one graphic in queue, control proceeds to block 2476 where the process graphic editor 504 checks if there is at least one parameter in queue. In the case where a parameter is processed through block 2462 and the process graphic editor 504 determines there is not at least one graphic configured for the parameter, the parameter may be considered processed and may not be considered as an un-linked parameter in block 2476. If there is at least one parameter, control loops back to block 2456 and the next parameter is processed. If there is not at least one parameter remaining in queue, the method 2450 ends.

Figure 24D:
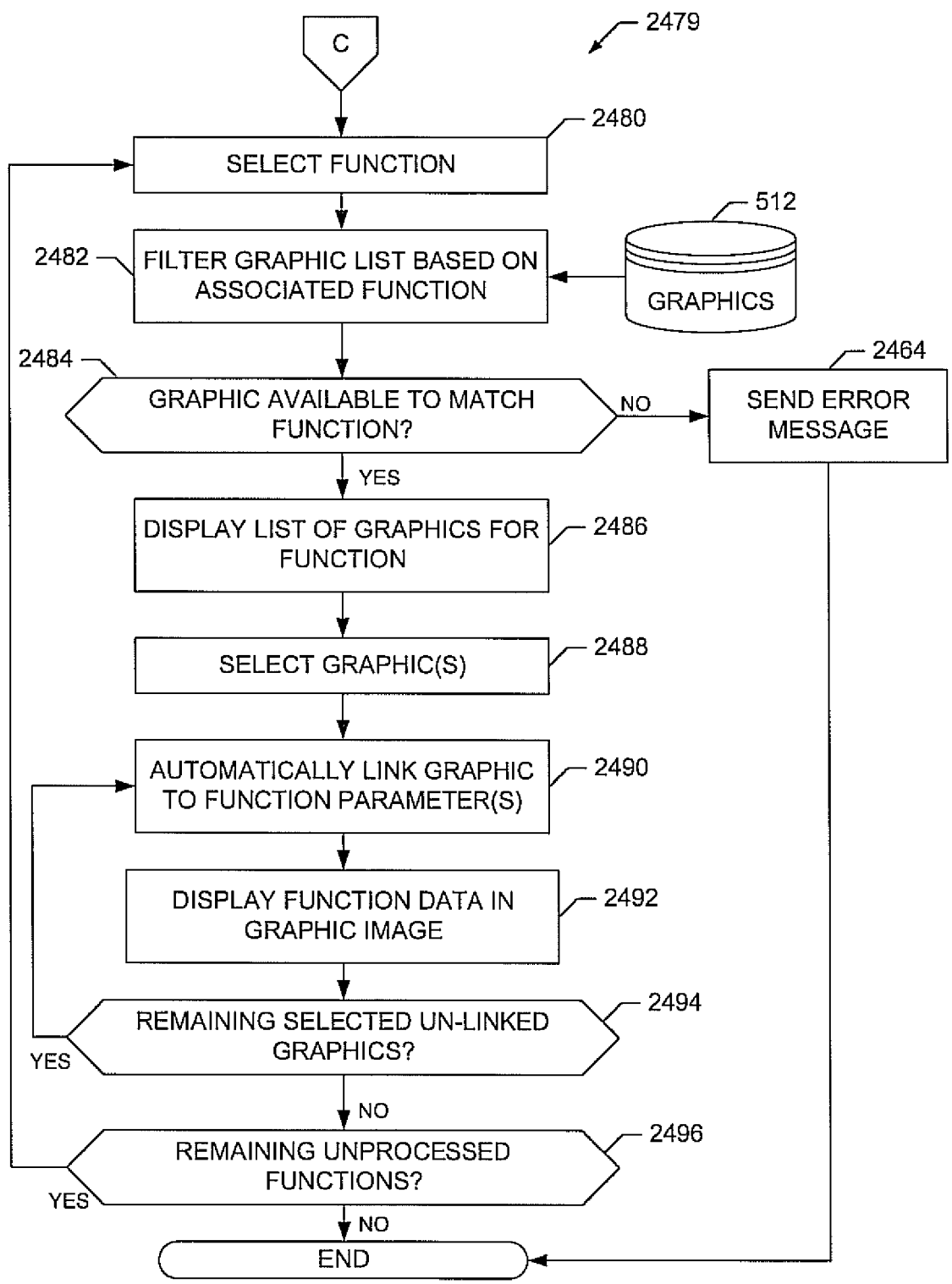

In block 2480 of FIG. 24D, the method 2479 associated with the process graphic editor 504 queues the dragged-and-dropped process control algorithm information and processes the next function in line (block 2480). Then, in block 2482, the process graphic editor 504 relays the function and/or parameter(s) within the function onto the graphics list filter 510, where the graphics list filter 510 accesses the graphics cache 512 and selects the graphics that match the data type field and any additional information with the parameter(s) within the function. Control then proceeds to block 2484 where the process graphic editor 504 processes the list of graphics returned from the graphics list filter 510. If there is not at least one graphic on the list, block 2464 is executed where an error message is sent.

If there is at least one graphic in the filtered list, control proceeds to block 2486 where the process graphic editor 504 displays the filtered list of graphics. Then, in block 2488, one or more of the graphics are selected. Next, in block 2490, the selected graphics are queued and the data source field associated with the next graphic in line is automatically linked to the parameter(s) within the function by the auto path generator 514. Then, in block 2492, the graphic displays the data contained in its associated data source field. Next, in block 2494, the auto path generator 514 checks if there are remaining graphics in queue. If there is at least one graphic, control loops back to block 2490 and the next graphic in line is automatically linked to the parameter(s) within the function. If there is not at least one graphic in queue, control proceeds to block 2496 where the process graphic editor 504 checks if there is at least one function in queue. In the case where a function is processed through block 2484 and the process graphic editor 504 determines there is not at least one graphic configured for the function, the function may be considered processed and may not be considered as an un-linked function in block 2496. If there is at least one function, control loops back to block 2480 and the next function is processed. If there is not at least one function remaining in queue, the method 2479 ends. In the case in which parameters within more than one function are to be linked to one graphic, the example method 2479 may prompt a system designer with a list of at least some of the parameters within the more than one function dragged-and-dropped on the process control graphic image, enabling the system designer to select the parameters to link to the graphic.

Figure 25:
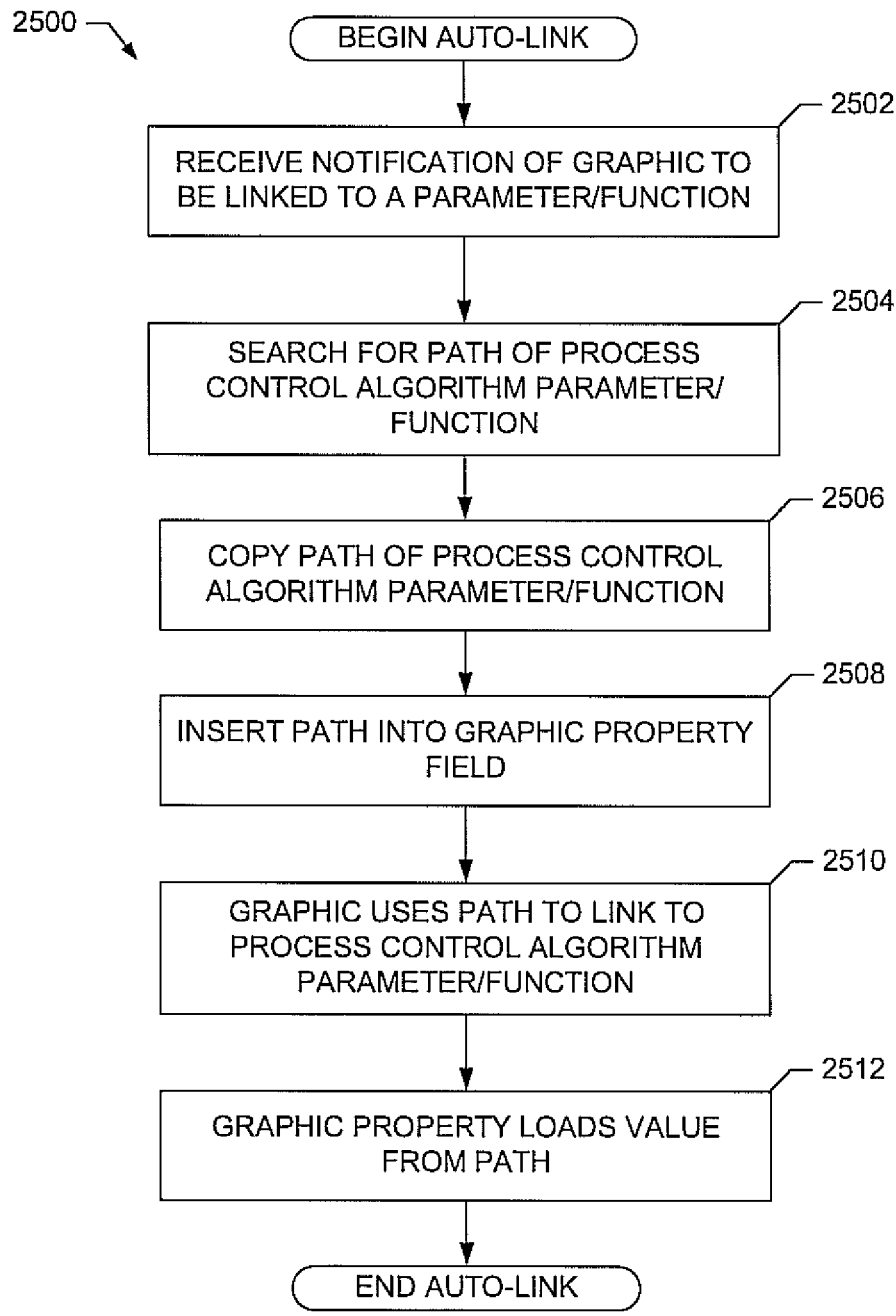
FIG. 25 is a flow diagram of an example method that may be used to automatically link a path between process control algorithm information and process control graphics.

An example method 2500 that may be performed to implement the example the auto path generator 514 of FIG. 5 is shown in FIG. 25. The example method 2500 may be executed at predetermined intervals, based on an occurrence of a predetermined event, etc., or any combination thereof. For example, the method 2500 may be executed in a design environment upon start-up of the auto path generator 514, at predetermined intervals, such as hourly, daily, etc. Additionally or alternatively, the example method 2500 may be executed upon the occurrence of a trigger generated remotely, for example, at the process graphic editor 504 when process control algorithm information is dragged-and-dropped from the process control algorithm compiler 502.

The method 2500 begins at block 2502 where the auto path generator 514 receives notification from the process graphic editor 504 of a graphic to be linked to process control algorithm information. The notification may contain an identifier and/or the data source field of the graphic. Additionally, the notification may contain the process control algorithm information to be linked to the graphic. This may contain a function identifier, a parameter identifier, and/or parameter(s) within one or more functions identifiers. Then, in block 2504, the auto path generator 514 searches for the process control algorithm information associated with the function and/or parameter identifiers. Once the process control algorithm information is found, the auto path generator 514 copies the path associated with the data source within the process control algorithm information (block 2506). Then, in block 2508, the copied path is inserted in the data source field associated with the graphic. Control then proceeds to block 2510 where the graphic accesses the data source path back to the process control algorithm information within the corresponding function and/or parameter. Then, in block 2512, the graphic loads the data source within the parameter, and/or parameter(s) within the one or more functions ending the auto link method 2500.

Figure 26:
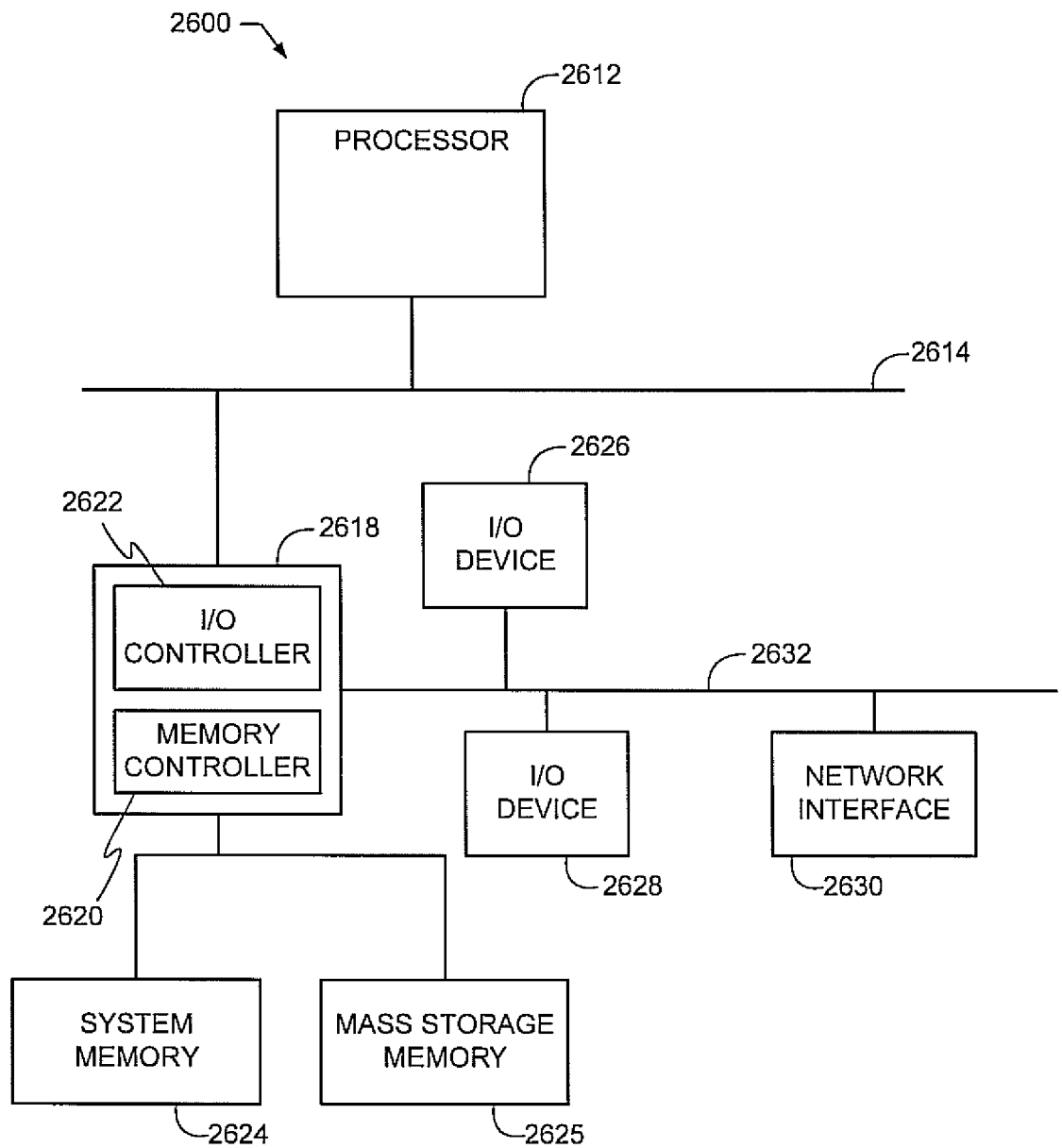
FIG. 26 is a block diagram of an example processor system that may be used to implement the example methods and apparatus described herein.

FIG. 26 is a block diagram of an example processor system 2600 that may be used to implement the apparatus and methods described herein. As shown in FIG. 26, the processor system 2600 includes a processor 2612 that is coupled to an interconnection bus 2614. The processor 2612 includes a register set or register space 2616, which is depicted in FIG. 26 as being entirely on-chip, but which could alternatively be located entirely or partially off-chip and directly coupled to the processor 2612 via dedicated electrical connections and/or via the interconnection bus 2614. The processor 2612 may be any suitable processor, processing unit or microprocessor. Although not shown in FIG. 26, the system 2600 may be a multi-processor system and, thus, may include one or more additional processors that are identical or similar to the processor 2612 and that are communicatively coupled to the interconnection bus 2614.

The processor 2612 of FIG. 26 is coupled to a chipset 2618, which includes a memory controller 2620 and a peripheral input/output (I/O) controller 2622. As is well known, a chipset typically provides I/O and memory management functions as well as a plurality of general purpose and/or special purpose registers, timers, etc. that are accessible or used by one or more processors coupled to the chipset 2618. The memory controller 2620 performs functions that enable the processor 2612 (or processors if there are multiple processors) to access a system memory 2624 and a mass storage memory 2625.

The system memory 2624 may include any desired type of volatile and/or non-volatile memory such as, for example, static random access memory (SRAM), dynamic random access memory (DRAM), flash memory, read-only memory (ROM), etc. The mass storage memory 2625 may include any desired type of mass storage device including hard disk drives, optical drives, tape storage devices, etc.

The peripheral I/O controller 2622 performs functions that enable the processor 2612 to communicate with peripheral input/output (I/O) devices 2626 and 2628 and a network interface 2630 via a peripheral I/O bus 2632. The I/O devices 2626 and 2628 may be any desired type of I/O device such as, for example, a keyboard, a video display or monitor, a mouse, etc. The network interface 2630 may be, for example, an Ethernet device, an asynchronous transfer mode (ATM) device, an 802.11 device, a DSL modem, a cable modem, a cellular modem, etc. that enables the processor system 2600 to communicate with another processor system.

While the memory controller 2620 and the I/O controller 2622 are depicted in FIG. 26 as separate functional blocks within the chipset 2618, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of automatically linking process control algorithms to process control algorithm information, the method comprising:
   displaying, at a first device, a first process control image area, the first process control image area for displaying a process control algorithm associated with process control algorithm information, the process control algorithm information comprising one or more process control algorithm parameters;
   displaying, at the first device and adjacent to the first process control image area, a second process control image area, the second process control image area displaying one or more process control graphics;
   linking a first process control graphic to a first process control algorithm parameter;
   presenting a list of control functions associated with the first linked parameter of the first process control graphic in response to the first process control graphic being dragged-and-dropped from the second process control image area to the first process control image area; and
   in response to selection of a control function from the list of control functions, generating a graphical representation of a control algorithm of the selected control function associated with the first linked parameter of the first process control graphic, the generated graphical representation of the control algorithm displayed in the first process control image area.

2. A method as defined in claim 1, further comprising selecting and dragging at least some of the process control algorithm information to the first process control graphic to automatically link a path for the at least some of the process control algorithm information to the first process control graphic.

3. A method as defined in claim 2, further comprising automatically linking a plurality of paths for the at least some of the process control algorithm information to the first process control graphic.

4. A method as defined in claim 2, wherein selecting comprises one of copying, highlighting, lassoing, or boxing with a cursor.

5. A method as defined in claim 2, wherein dragging comprises one of dropping, pasting, inserting, or moving.

6. A method as defined in claim 2, further comprising selecting and dragging multiple parameters to the first process control graphic.

7. A method as defined in claim 1, further comprising displaying information representing at least some of the process control algorithm information linked to the first process control graphic.

8. A method as defined in claim 1, wherein the process control algorithm information comprises at least one process control function containing the first process control algorithm parameter.

9. A method as defined in claim 1, wherein the first process control graphic comprises a defined property prior to automatically linking the at least some of the process control algorithm information to the first process control graphic.

10. A method as defined in claim 1, further comprising automatically linking at least some of the process control algorithm information to a property of the first process control graphic.

11. A method as defined in claim 10, wherein the first one of the properties of the process control algorithm further comprises a data source field.

12. A method as defined in claim 1, further comprising selecting and dragging multiple process control parameters to the second process control image area.

13. A method as defined in claim 1, further comprising automatically linking a second one of the process control algorithm parameters to a second property of the first process control graphic.

14. A method as defined in claim 1, wherein the one or more process control graphics comprise at least one of a numeric field, a display element, a graph, a chart, data, or a data representation.

15. A method as defined in claim 1, further comprising displaying a graphic representing at least some of the process control algorithm information automatically linked to the first process control graphic.

16. A method as defined in claim 1, further comprising displaying the list prior to automatically linking the at least some of the process control algorithm information to the first process control graphic.

17. A method as defined in claim 1, further comprising filtering the list based on the first process control graphic dragged to the second process control image area.

18. A method as defined in claim 1, further comprising:
   displaying in the first process control image area process control hardware information; and automatically linking at least some of the process control hardware information to the first process control graphic in the second process control image area in response to user inputs.

19. A method as defined in claim 1, further comprising selecting and dragging the one or more process control graphics to the second process control image area.

20. A method as defined in claim 1, further comprising selecting and dragging a second process control graphic to the first process control image area, the second process control graphic linked to a second process control algorithm parameter, prompting a user with a second list of at least one process control function associated with the second process control algorithm parameter, and in response to selecting a second control function from the second list, creating a second graphical representation of the second control algorithm of the second selected control function, for display in the first process control image area.

21. A method as defined in claim 20, further comprising displaying the second graphical representation of the control algorithm of the second selected control function representing the second one of the process control graphics.

22. A method as defined in claim 20, further comprising displaying the second list prior to automatically linking a path for the second process control graphic to the second process control algorithm parameter.

23. A method as defined in claim 20, further comprising filtering the second list based on the first process control graphic dragged-and-dropped to the second process control image area.

24. A method as defined in claim 1, wherein presenting the list of control functions associated with the first linked parameter of the first process control graphic further comprises:
filtering the presented list of control functions by cross-referencing the first linked parameter with a look-up table.

25. A system to automatically link process control algorithms to process control algorithm information, the system comprising:
a display in a first device to display a first process control image area, the first process control image area for displaying a process control algorithm associated with process control algorithm information, the process control algorithm information comprising one or more process control algorithm parameters, and to display a second process control image area adjacent to the first process control image area, the second process control image area displaying a first process control graphic, the first process control graphic linked to a first process control algorithm parameter; and
a processor in the first device to present a list of control functions associated with the first linked parameter of the first process control graphic in response to the first process control graphic being dragged-and-dropped from the second process control image area to the first process control image area, generate a graphical representation of a control algorithm of a control function selected from the list associated with the first linked parameter of the first process control graphic and displaying the generated graphical representation of the control algorithm in the first process control image area.

26. A computer readable storage device comprising instructions stored thereon which, when executed, cause a machine to at least:
display, at a first device, a first process control image area, the first process control image area for displaying a process control algorithm associated with process control algorithm information, the process control algorithm information comprising one or more process control algorithm parameters;
display, at a first device and adjacent to the first process control image area, a second process control image area, the second process control image area displaying a first process control graphic and to display a plurality of properties of the first process control graphic;
link the first process control graphic to a first one of the process control algorithm parameters;
presenting a list of control functions associated with the first linked parameter of the first process control graphic in response to the first process control graphic being dragged-and-dropped from the second process control image area to the first process control image area; and
in response to selection of a control function from the list of control functions, generate a graphical representation of a control algorithm of the selected control function associated with the first linked parameter of the first process control graphic, the generated graphical representation of the control algorithm displayed in the first process control image area.

\* \* \* \* \*